(12) United States Patent
Seddigh et al.

(10) Patent No.: US 10,320,619 B2
(45) Date of Patent: Jun. 11, 2019

(54) METHOD AND SYSTEM FOR DISCOVERY AND MAPPING OF A NETWORK TOPOLOGY

(71) Applicant: SOLANA NETWORKS INC., Ottawa (CA)

(72) Inventors: Nabil Seddigh, Ottawa (CA); Biswajit Nandy, Ottawa (CA); Rupinder Singh Makkar, Ottawa (CA); Craig Dillabaugh, Chelsea (CA); Kevin Wong, Ottawa (CA)

(73) Assignee: SOLANA NETWORKS INC., Ottawa (CA)

( * ) Notice: Subject to any disclaimer, the term of this patent is extended or adjusted under 35 U.S.C. 154(b) by 12 days.

(21) Appl. No.: 15/811,655

(22) Filed: Nov. 13, 2017

(65) Prior Publication Data

US 2018/0139104 A1 May 17, 2018

Related U.S. Application Data

(60) Provisional application No. 62/421,255, filed on Nov. 12, 2016.

(51) Int. Cl.
*H04L 12/24* (2006.01)

(52) U.S. Cl.
CPC .......... *H04L 41/12* (2013.01); *H04L 41/0213* (2013.01)

(58) Field of Classification Search
CPC . H04L 41/12; H04L 41/5009; H04L 43/0829; H04L 43/0852; H04L 43/50; H04L 45/02; H04L 41/0893; H04L 41/0253; H04L 41/06; H04L 41/0803; H04L 41/5003
See application file for complete search history.

(56) References Cited

U.S. PATENT DOCUMENTS

| | | | | |
|---|---|---|---|---|
| 2002/0156883 | A1* | 10/2002 | Natarajan | H04L 29/12264 709/224 |
| 2003/0204619 | A1* | 10/2003 | Bays | H04L 41/0253 709/238 |
| 2004/0151128 | A1* | 8/2004 | Wechter | H04L 41/12 370/254 |
| 2013/0322298 | A1* | 12/2013 | Alexander, Jr. | H04L 41/12 370/255 |
| 2016/0127193 | A1* | 5/2016 | Deniaud | H04L 61/2046 709/208 |

OTHER PUBLICATIONS

Galloway, Brendan and Gerhard P. Hancke, "Introduction to Industrial Control Networks" Communications Surveys & Tutorials, IEEE 15, No. 2 (2013): 860-880.

(Continued)

*Primary Examiner* — Sai Aung
(74) *Attorney, Agent, or Firm* — IP-MEX Inc.; Victoria Donnelly

(57) ABSTRACT

Systems and methods for discovery and mapping of industrial control and SCADA networks are described herein. The disclosed systems and methods help operators ensure the cyber security of their SCADA network through accurate discovery, fingerprinting and mapping the industrial control network map, including PLCs (Programmable Logic Controller) and RTUs (Remote Terminal Unit), using passive techniques.

22 Claims, 19 Drawing Sheets

(56) References Cited

OTHER PUBLICATIONS

Stouffer, Keith, Joe Falco, and Karen Scarfone, "Guide to Industrial Control Systems (ICS) Security", NIST Special Publication (2011): 800-82.

D. Formby, P. Srinivasan, A. Leonard, J. Rogers, and R. Beyah, "Who's in Control of Your Control System? Device Fingerprinting for Cyber-Physical Systems", in Network and Distributed System Security Symposium (NDSS), Feb. 2016.

\* cited by examiner

METHOD AND SYSTEM FOR DISCOVERY AND MAPPING OF A NETWORK TOPOLOGY

FIELD OF THE INVENTION

The embodiments described herein relate generally to network control systems, and in particular to discovery of topology of industrial control networks.

BACKGROUND OF THE INVENTION

Industrial Control Systems (ICS) refer to the networked equipment and software used to control and monitor industrial systems. Such systems are key elements in a range of critical infrastructure sectors and other industries including electrical, water, wastewater, oil and natural gas, chemical, manufacturing and transport. These systems may be localized, as in the case of a manufacturing facility, or highly distributed, as in the case of an oil or gas pipeline or electrical grid.

Industrial control systems are composed of specialized components and applications such as Programmable Logic Controllers (PLCs), Distributed Control Systems (DCSs), and Supervisory Control and Data Acquisition (SCADA) systems. PLCs are solid state electronic devices that form the core of industrial control networks. DCSs are fully automated systems that control the operation of processes within an industrial facility, and are sometimes called Process Control Systems (PCS) (Stouffer et. al.). Industrial Control and SCADA networks control critical infrastructure such as power plants, nuclear facilities, water supply/treatment systems and transportation systems. These systems are increasingly becoming the target of sophisticated and unsophisticated cyber attacks by cyber threat actors of different kinds, with successful attacks having the potential to cause widespread damage, cost and injury/loss of life.

It should be noted that the term SCADA is often used to describe Industrial Control System (ICS) networks. This is somewhat of a misnomer, as SCADA systems themselves make up one component of the larger ICS networks, but the term is broadly used to denote such networks—a convention we shall follow in the presenting description.

Situational awareness tools are widely used in diverse sectors such as, for example, military command and control, ship navigation and power plant operations. In general, such tools combine disparate data and analytics with visual maps (either geographic or otherwise) to allow decision-makers to quickly process complex and dynamic data and make critical decisions. More recently, situational awareness tools have been developed and utilized in the Information Technology (IT) industry to distill large amounts of data from different security and network sensors, allowing security and network operators to make decisions to defend the IT network against security threats. As industrial control networks continue to witness greater connectivity to the outside world, the need for SCADA Cyber Situational Awareness tools (SCADA CSAT) becomes greater. The larger and more connected the SCADA network, the more critical it becomes to have a SCADA CSAT tool.

FIG. 1 illustrates an example of a SCADA network. SCADA networks differ from traditional corporate networks in a number of ways. These differences present a number of challenges in the quest to defend the network against cyber threats—malicious, criminal or otherwise. First of all, a number of specialized protocols have been developed, often for historical reasons, which are used exclusively within SCADA networks. Some of the more popular protocols include Modbus, DNP3, Profinet, EtherNet/IP (not to be confused with either the Ethernet or IP protocols). These protocols, some of which are quite old, have not necessarily been designed with security in mind. Secondly, as they are niche protocols, popular network security tools such as signature-based IDS (Intrusion Detection Systems) like Snort or Suricata, have limited support for many of these protocols.

Traffic characteristics of SCADA networks also differ drastically from traditional corporate IT networks. The majority of traffic in SCADA networks is generated by devices controlling or monitoring the physical environment and master control and monitoring systems. Such communications are often based on timers and occur at regular intervals, and between the same hosts within the network. Thus the pattern of communications is relatively deterministic and periodic in nature. This is quite different compared to traffic on an IT network which is generated by human beings and which can be quite noisy and non-deterministic in nature.

Historically, proprietary technologies were utilized for SCADA and ICS networks. This proprietary nature greatly assisted in their security—a factor sometimes referred to as "security by obscurity". The standardization of various elements of ICS networks over the last few years coupled with the trend of connecting these systems to WAN (Wide Area Networks), Enterprise Networks and the Internet, has opened up access to such networks. This opening up of ICS networks has led to a number of security issues. This is partly because the specialized protocols at the heart of ICS devices such as PLCs (Programmable Logic Controllers) were not designed with security in mind, leaving them susceptible to cyber security threats. In addition, the network architectures and security tools of SCADA networks have not received the same attention from a security perspective as IT networks which were earlier subjects of malicious cyber threats (Galloway et. al.). Finally, SCADA software such as HMI (Human Machine Interface) are used to control physical industrial processes via PLCs. HMI software is often run on Windows platforms which are susceptible to many security threats.

While SCADA networks are in many ways like IT networks, they also present a number of distinctive characteristics which means that traditional IT security products and solutions cannot be used as-is on a SCADA network. As such, specialized cyber security tools are required for such networks. Systems and methods are required to successfully discover the network topology for SCADA systems and provide security operators with situational awareness capabilities to defend against cyber threats.

Traditional approaches to device discovery scan an entire network to find live IP addresses. This is done by sending a packet or set of packets to each possible IP address in a network range and waiting to receive a response (e.g. sending ping messages). This approach takes a long time to complete discovery of devices. For example, some networks utilize a large address space but live devices may only be found on a small section of the network. (e.g. a large company may use the 47.0.0.0/8 address space which could hold 16 million IP addresses, but at a maximum only use 2% of the address space. Sending pings too frequently would cause overload of traffic on the network (e.g. sending a ping every millisecond would generate 1000 packets per second which is far too heavy weight to be acceptable for IT networks). As such network management solutions may send a ping packet every 10 ms which translates to 100 packets per second. Scanning the full address range would take 160,000 seconds (44 hours). Approaches such as this are the norm in deployed network discovery and network topology mapping solutions.

Typically, existing approaches to discover the network mapping and network topology for a SCADA network use the following general method:
1. Identify the IP address range for the network to be discovered;
2. Send ping packets to every IP address in the range to discover live devices which respond;
3. Identify devices that respond as eligible devices;
4. Determine which devices respond to SNMP queries;
5. Interrogate the devices using SNMP to determine whether they are routers, switches or end-systems; and
6. Based on SNMP Management Information Base (MIB) information, begin determining the connectivity map (ie topology of the network).

These approaches have several drawbacks. The discovery time is slow for large networks due to having to search through too many IP addresses, most of which may not correspond to actual devices. Further, there may be a number of silent or inactive devices in the network that won't be discovered by these methods, making a full discovery impossible. Therefore, there is a need for improvement. It would be beneficial to cyber security and other network application to achieve a fast network topology discovery and an accurate discovery of devices in the network.

SUMMARY OF THE INVENTION

There is an object of the invention to provide a network topology discovery, classification on network devices and identification of silent devices.

According to one aspect of the invention, there is provided a method for discovering topology of a network comprising a Layer 3 and a Layer 2, the method comprising:
employing at least one hardware processor for:
discovering a first Layer 3 network topology by examining routing protocols using route analytics method;
discovering a second Layer 3 network topology using information from at least one of Simple Network Management Protocol (SNMP) and Source Shell/Command Line Interface/Telnet login to a router; and
merging and deduplicating the first discovered Layer 3 network topology and the second discovered Layer 3 network topology to obtain a resultant Layer 3 network topology that includes a plurality of routers and associated links between the routers.

The method described above further comprises using the resultant Layer 3 network topology to identify a plurality of subnets in Layer 2 corresponding to each of the plurality of routers by:
retrieving a list of active interfaces for each discovered router; and
discovering routable subnets on each active interface using a combination of information from the SNMP and the routing protocols.

The method described above further comprises detecting a plurality of active devices and a plurality of silent devices in each of the plurality of identified subnets in Layer 2 to discover topology of the Layer 2 of the network.

The method described above further comprises merging and deduplicating the discovered topology of the Layer 2 with the resultant topology of the Layer 3 to discover a full Layer 2/3 topology.

In the method described above, the detecting of silent devices comprises monitoring and analyzing network traffic flow information and examining data obtained from the plurality of routers and a plurality of switches in the Layer 2.

In the method described above, the analyzing traffic flow information further comprises determining IP addresses of devices that are sending and/or receiving traffic-flow, and ensuring the traffic-flow is bi-directional.

Also additionally a timing alignment between traffic-flows is verified, to ensure that traffic that was sent earlier has earlier time stamps, and traffic that was sent in response has later time stamps.

Further, for networks with TCP protocol, a presence of an initial handshake is verified, and involved devices are identified.

The plurality of devices may be also additionally or alternatively identified by using at least one of a ping method and a probe packets method.

In the method described above, the examining data comprises using at least one of SNMP and Command Line Interface (CLI) to examine Address Resolution Protocol (ARP) tables and Address Forwarding Tables (AFT) of the plurality of switches.

The method described above further comprises classifying the detected plurality of active and silent devices, comprising:
fusing data from at least two classification methods;
obtaining a certainty level for device classification by combining certainty levels for type of device outputted from the at least two classification methods; and
using the certainty level to identify device type and class.

In the method described above, the at least two classification methods include any two of the SNMP analysis, Media Access Control (MAC) analysis and network traffic-flow analysis.

In the method described above, the merging and deduplicating of the first discovered Layer 3 network topology and the second discovered Layer 3 network topology further comprises:
distilling the first and second discovered network topologies into a plurality of nodes and links;
searching the plurality of nodes in the first and the second discovered Layer 3 network topology;
identifying a plurality of candidate nodes in the second discovered topology that are not present in the first discovered topology, and add the candidate nodes to the first discovered topology;
searching the plurality of links in the first and the second discovered Layer 3 network topology;
discarding links found in the second discovered topology that also exists in the first discovered topology;
identifying a plurality of candidate links in the second discovered topology that are not present in the first discovered topology; and
using information from the SNMP and the routing protocols to validate a set of links from the plurality of candidate links and add the validated set of links to the first discovered topology.

The method described above may be applicable to topology discovery in various types of networks, for example a Supervisory Control and Data Acquisition (SCADA) network.

According to another aspect of the invention, there is provided a system for discovering topology of a network comprising a Layer 3 and a Layer 2, the system comprising:

at least one hardware processor, and computer readable storage medium having computer readable instructions stored thereon for execution by the processor, causing the processor to:

discover a first Layer 3 network topology by examining routing protocols using route analytics method;

discover a second Layer 3 network topology using information from at least one of Simple Network Management Protocol (SNMP) and Source Shell/Command Line Interface/Telnet login to a router; and merge and deduplicate the first discovered Layer 3 network topology and the second discovered Layer 3 network topology to obtain a resultant Layer 3 network topology that includes a plurality of routers and associated links between the routers.

In the system described above, the computer readable instructions further cause the processor to use the resultant Layer 3 network topology to identify a plurality of subnets in Layer 2 corresponding to each of the plurality of routers by:

retrieving a list of active interfaces for each discovered router; and discovering routable subnets on each active interface using a combination of information from the SNMP and the routing protocols.

In the system described above, the computer readable instructions further cause the processor to detect a plurality of active devices and a plurality of silent devices in each of the plurality of identified subnets in Layer 2 to discover topology of the Layer 2 of the network.

In the system described above, the computer readable instructions further cause the processor to merge and deduplicate the discovered topology of the Layer 2 with the resultant topology of the Layer 3 to discover a full Layer 2/3 topology.

In the system described above, the computer readable instructions further cause the processor to detect silent devices by monitoring and analyzing network traffic flow information and examining data obtained from the plurality of routers and a plurality of switches in the Layer 2.

In the system described above, the computer readable instructions further cause the processor to determine IP addresses of devices that are sending and/or receiving traffic-flow, and ensuring the traffic-flow is bi-directional.

In the system described above, the computer readable instructions further cause the processor to use at least one of SNMP and CLI to examine Address Resolution Protocol (ARP) tables and Address Forwarding Tables (AFT) of the plurality of switches for the examining data.

In the system described above, the computer readable instructions further cause the processor to classify the detected plurality of active and silent devices by:

fusing data from at least two classification methods;

obtaining a certainty level for device classification by combining certainty levels for type of device outputted from the at least two classification methods; and using the certainty level to identify device type and class.

In the system described above, the computer readable instructions further cause the processor to classify the plurality of detected devices according to any two classification methods, for example, SNMP analysis, MAC analysis and network traffic-flow analysis. It is also understood that other classification methods may be applicable.

In the system described above, the computer readable instructions further cause the processor to merge and deduplicate of the first discovered Layer 3 network topology and the second discovered Layer 3 network topology, comprising:

distilling the first and second discovered network topologies into a plurality of nodes and links;

searching the plurality of nodes in the first and the second discovered Layer 3 network topology;

identifying a plurality of candidate nodes in the second discovered topology that are not present in the first discovered topology, and add the candidate nodes to the first discovered topology;

searching the plurality of links in the first and the second discovered Layer 3 network topology;

discarding links found in the second discovered topology that also exists in the first discovered topology;

identifying a plurality of candidate links in the second discovered topology that are not present in the first discovered topology; and using information from the SNMP and the routing protocols to validate a set of links from the plurality of candidate links and add the validated set of links to the first discovered topology.

The system described above may be applicable to different types of networks, including a Supervisory Control and Data Acquisition (SCADA) network.

According to yet another aspect of the invention, there is provided a network comprising a plurality of routers, the network comprising:

a system for discovering topology of a network comprising a Layer 3 and a Layer 2, the system comprising:

at least one hardware processor, and computer readable storage medium having computer readable instructions stored thereon for execution by the processor, causing the processor to:

discover a first Layer 3 network topology by examining routing protocols using route analytics method;

discover a second Layer 3 network topology using information from at least one of Simple Network Management Protocol (SNMP) and Source Shell/Command Line Interface/Telnet login to a router; and merge and deduplicate the first discovered Layer 3 network topology and the second discovered Layer 3 network topology to obtain a resultant Layer 3 network topology that includes a plurality of routers and associated links between the routers.

According to one more aspect of the invention, there is provided a Cyber Situational Awareness Tool for Supervisory Control and Data Acquisition (CSAT-SCADA) system to discover a SCADA network topology, said system comprising: a CSAT-SCADA back-end deployed on the SCADA network, wherein the CSAT-SCADA back-end comprises:

a routing collector unit for obtaining routing protocol information from the network;

an SNMP analyzer unit for obtaining SNMP Management Information Base (MIB) data from a plurality of devices on the SCADA network;

a traffic flow collector unit for receiving and distilling traffic flow information; and a SCADA network topology discovery unit for discovering devices on the SCADA network, using outputs from the routing collector, the SNMP analyzer, and the traffic flow collector.

The CSAT-SCADA system described above is configured to detect cyber threats and build a situational awareness, wherein the system further comprises:

a SCADA anomaly detection unit to monitor traffic flow information and detect cyber threats by applying anomaly detection and machine learning techniques to statistics which it distills from the traffic flow information; a situational awareness analyzer unit that combines the SCADA network map with cyber threat information and security analytics to create a situational awareness view of the network posture; and a SCADA security analysis unit applies analytics to traffic flow information to detect security threats not discovered by the anomaly detection module.

The CSAT-SCADA system described above further comprises a Graphic User Interface (GUI) unit.

In the CSAT-SCADA system described above, the CSAT-SCADA back-end further comprises:

a manager (SFMgr) communicating with one or more network traffic analysis engines (the SFAgent) or network topology analysis modules (SHL2); and a database (DB) component for data persistence.

Glossary of Abbreviations

CLI: Command Line Interface
CSAT: Cyber Situational Awareness Tool
DCS: Distributed Control Systems
GUI: Graphic User Interface
HMI: Human Machine Interface
loT: Internet of things
IP: Internet Protocol
LAN: Local Area Network
OSI: Open Systems Interconnection
OSPF: Open Shortest Path First is a routing protocol for IP networks.
OUID: Organizationally unique identifier which forms part of a MAC address
PCS: Process Control Systems
PLC: Programmable Logic Controller
RTU: Remote Terminal Unit
SSH: Source Shell
TCP: Transmission Control Protocol
VLAN: Virtual LAN
WAN: Wide Area Networks Glossary of Terms Address Forwarding Table (AFT): An AFT is a table used in Ethernet switches which identifies the outgoing port to forward packets destined for a particular destination MAC address.
Address Resolution Protocol (ARP): The ARP translates IP addresses to MAC addresses.
EtherNet/IP: a protocol widely used by devices in manufacturing automation.
Industrial Control Systems (ICS): networked equipment and software that is used to control and monitor industrial systems.
Intermediate System to Intermediate System (ISIS): is a routing protocol for moving data within a network.
Layer 2 (L2): The term refers to the second Layer (also called the Data Link Layer) according to the OSI model.
Layer 3 (L3): The term refers to the third Layer (also called the Network Link Layer) according to the OSI model.
Media Access Control (MAC): A sub Layer of L2 that controls how a device on the network gains access to the data and permission to transmit it.
Management Information Base (MIB): A MIB is a collection of data organized in a hierarchical fashion. The information may define a single object or multiple related objects. The data determines the properties of the managed object within a managed device, such as a router or a switch. Each managed device keeps a database of values for each of the definitions written in the MIB.
Network Topology: The layout of network nodes (devices) and their interconnection by links constitute the network's topology.
Network Mapping: The term refers to discovery of the devices on the network and their connectivity.
Route Analytics: A network monitoring technology to analyze the routing protocols in IP networks.
SCADA: Supervisory Control and Data Acquisition.
SIP: Session Initiation protocol.
Simple Network Management Protocol (SNMP): SNMP is an application Layer protocol that facilitates the exchange of management information between network tools (e.g. network management systems) and network devices. Network tools retrieve information from devices such as routers or switches using SNMP.
The information is stored in MIB defined formats.

BRIEF DESCRIPTION OF THE DRAWINGS

For a better understanding of the embodiments and/or related implementations described herein and to show more clearly how they may be carried into effect, reference will now be made, by way of example only, to the accompanying drawings which show at least one exemplary embodiment and/or related implementation in which.

Figure 1:
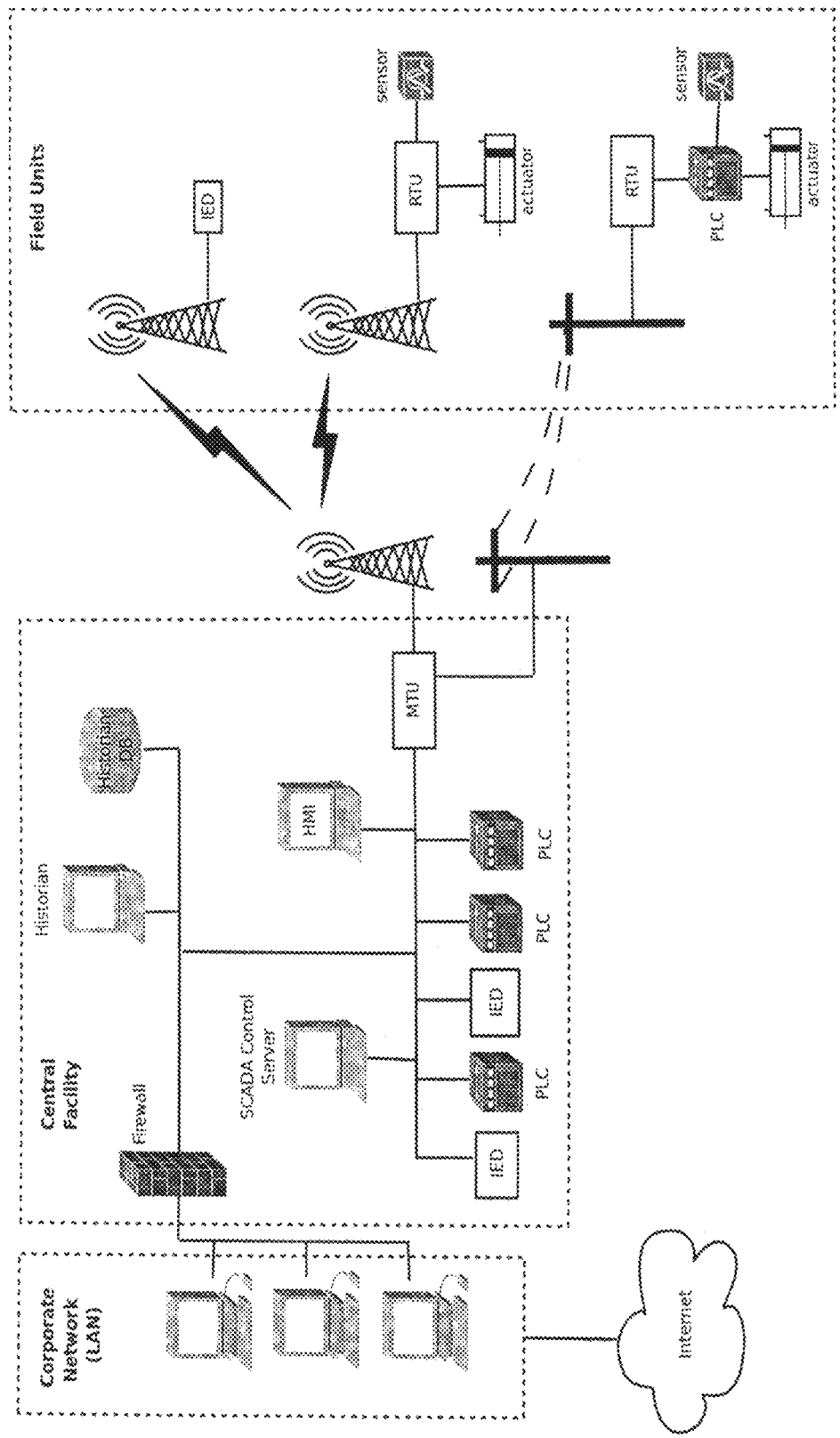
FIG. 1 illustrates an example of a SCADA network.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS

It will be appreciated that numerous specific details are set forth in order to provide a thorough understanding of the exemplary embodiments described herein.

However, it will be understood by those of ordinary skill in the art that the embodiments and/or implementations described herein may be practiced without these specific details. In other instances, well-known methods, procedures and components have not been described in detail so as not to obscure the embodiments and/or implementations described herein.

Furthermore, this description is not to be considered as limiting the scope of the embodiments described herein, but rather to describe the structure and operation of the various embodiments and/or implementations described herein.

In particular, the embodied methods for discovery of network topology and the devices in the network have been described for a SCADA ICS network by way of examples. However, it is understood that the methods can be applied to different types of networks and implemented in a number of other systems including network management systems and network planning tools.

The present invention describes a specialized approach to network topology discovery and mapping in ICS/SCADA networks in a novel manner. In this discussion, network mapping refers to discovery of the devices on the network and their connectivity. Network topology refers to the layout of network nodes (devices) and their interconnection by links. The terms network mapping and network topology discovery are used interchangeably in the literature to mean the same thing—a practice followed in this description.

The presenting novel network mapping and discovery may be integrated into Cyber Situational Awareness tools and Network Management Systems among others. Some notable aspects of this approach include: network discovery and classification of Industrial Control network devices (e.g. PLCs, RTUs, HMI and Historians) using passive techniques; and network topology discovery of the SCADA Industrial Control network including connectivity of industrial control routers, switches and end-devices.

Automated discovery of a SCADA network topology involves discovery of different types of devices—both standard network devices (industrial grade routers/switches) as well as devices which control physical industrial control processes but which are also connected to the network, also referred to as end devices (examples include PLCs). The presenting network topology discovery approach requires an innovative scheme to ensure fast discovery times and accuracy. Further, it should not cause PLCs or RTUs to stop working and impact physical processes on the industrial control network. Finally, the presenting approach involves incremental rediscovery of the network using a hierarchical approach. The disclosed methods in this invention may be used in a server and a network, and may also be implemented as a non-transitory computer readable media. Furthermore, the methods may be implemented in hardware (FPGA or ASICs), firmware or software as a full system or as a module in a bigger system. Examples, some of which embodied in this invention, include intrusion detection systems, network management systems, network monitoring systems, network planning systems, situational awareness systems, network security monitoring systems, automated cyber defence systems, etc.

Figure 2:
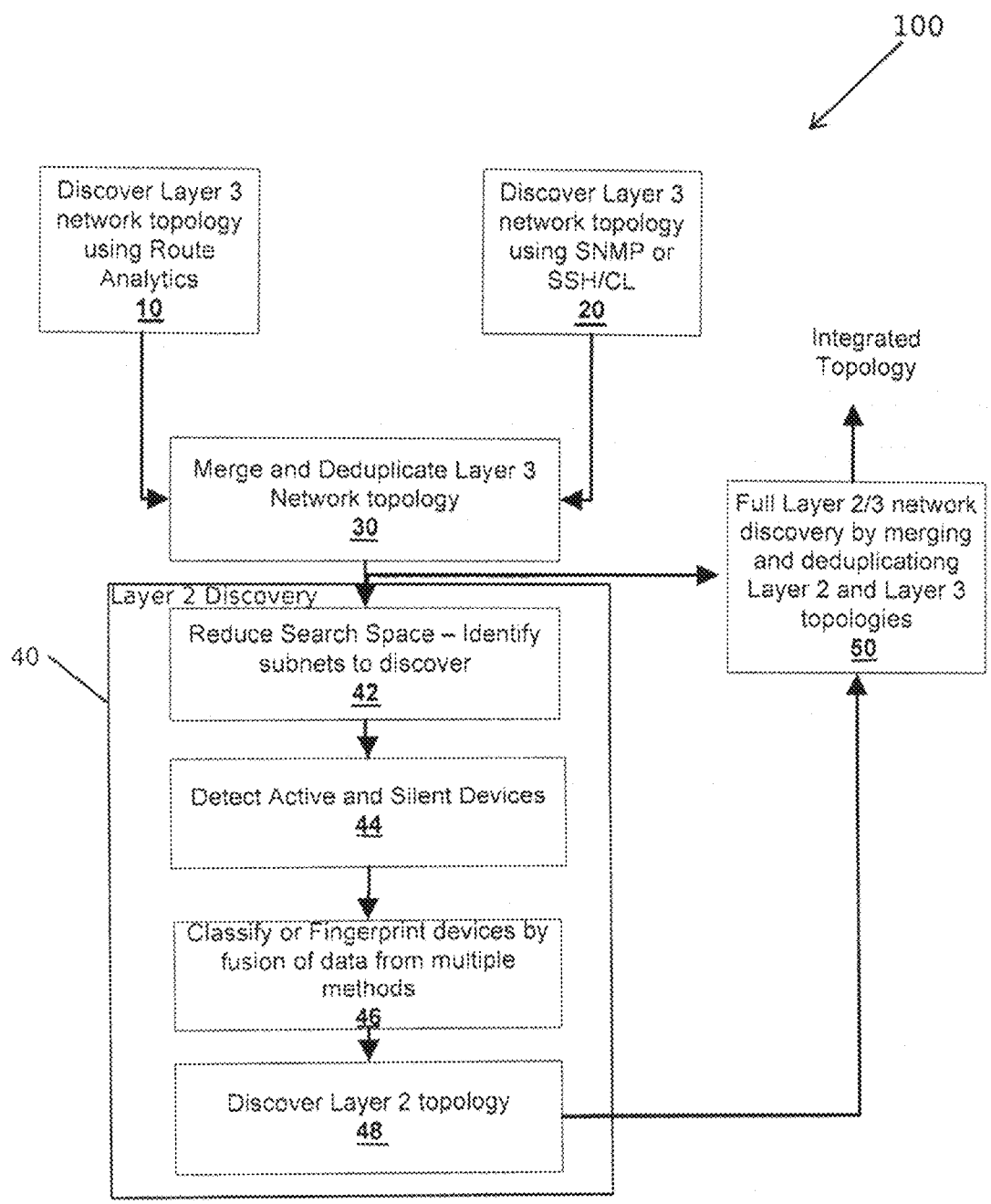
FIG. 2 illustrates steps of embodied methods for discovery of a SCADA Network Topology.

According to one embodiment of the invention, a method for SCADA topology discovery presents a strong improvement over the existing state of the art as described herein. Referring to FIG. 2, a method 100 for discovering the full network map and topology for an industrial control network is illustrated. In a hierarchical approach for the incremental discovery, the Layer 3 network map is discovered first. Layer 3, also known as the network layer, is responsible for routing data through a number of routers. As the first step, a mapping/topology of the Layer 3 network is discovered using a route analytics technique 10 which examines the routing protocols. Independently, a second discovery of the Layer 3 network topology is made using information retrieved via Simple Network Management Protocol (SNMP) or from information retrieved via SSH/CLI/Telnet login to a router 20. The two topologies or mappings are then merged to ensure all the routers discovered by the two methods are accounted for, and deduplicated to remove redundancies 30. The merging & deduplication of multiple Layer 3 discovery methods 30 refines and improves the accuracy of the discovered Layer 3 topology in the first topology or mapping 10 by merging and de-duplicating it with the Layer 3 topology second topology mapping 20. The resultant discovered Layer 3 network topology at step 30 also greatly reduces the time to discover the full and complete network map or topology by reducing the overall search space for Layer 2 discovery that follows.

Figure 3:
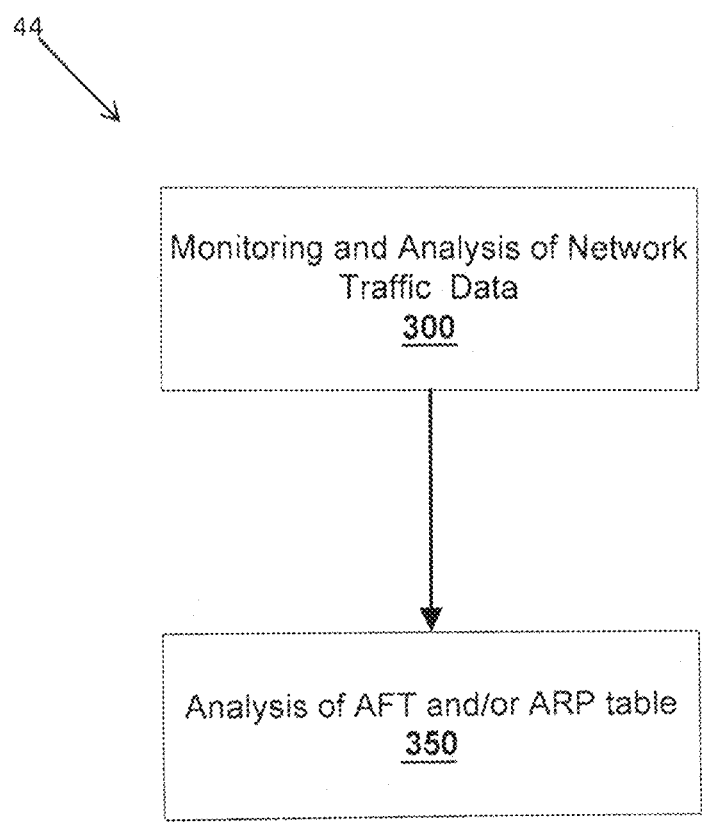
FIG. 3 illustrates two inference methods for detection of silent devices in the network.

According to one embodiment, the full Layer 3 network topology as discovered may then be used as the basis for the Layer 2 network discovery 40. The Layer 2 part of the network includes a number of Ethernet switches and end devices (e.g. PLCs, RTUs, printers, servers, HMI etc); and also includes the data links between such adjacent network nodes. The Layer 2 nodes and associated topology are typically found at the edge of a network. However, they may also be present as a cluster of devices between two Layer 3 routers. In this embodiment, first, a plurality of subnets corresponding to the routers in the discovered resultant Layer 3 topology is identified 42. That greatly reduces the search space to the identification of active subnets and avoids the pitfall in traditional approaches which build the network topology from crawling the entire possible IP space for an organization. Each subnet includes a plurality of active (live) devices and a plurality of silent devices that are to be detected 44. Active devices may be discovered using known methods such as ping or probe packets. According to one embodiment, as depicted in FIG. 3 discovery of silent devices is inferred from Address Forwarding Table (AFT) and Address Resolution Protocol (ARP) data on routers/switches 350 as well as from traffic flow data capture 300; where the AFT and ARP data is collected using SNMP. Detection of silent devices will be elaborated upon later.

Second, the detected Layer 2 devices are classified or fingerprinted using a passive approach relying on fusion of data from multiple different approaches 46. SNMP analysis, MAC analysis and a traffic-flow analysis (such as Netflow) are examples of classifying methods. Although Netflow is a specific format and type of traffic flow, in the industry, the term is commonly used as a general term for traffic flow. As a result within the presenting description, the term can be replaced with traffic flow. At least two classification methods are required for a reliable fingerprinting. Three or more methods may be used, if needed, to enhance the accuracy of device classification. Classification of devices in the identified subnets then leads to a full and complete mapping and topology discovery of Layer 2 48. Finally, the complete Layer 2/3 network topology of both Layers 3 and 2 are merged and deduplicated to discover the full Layer 2/3 network topology 50. The deduplication approach of the Layer 2/3 network topologies results in a more robust and accurate network topology without missing and incorrect links.

In a preferred embodiment, some or all the steps of method 100 is applied to discover the network topology of an industrial control network, for example a ICS-SCADA network. However, some or all the steps of method 100 can also be applied to non-ICS/non-SCADA networks and have application in other networks including Enterprise and IoT networks.

Figure 2A:
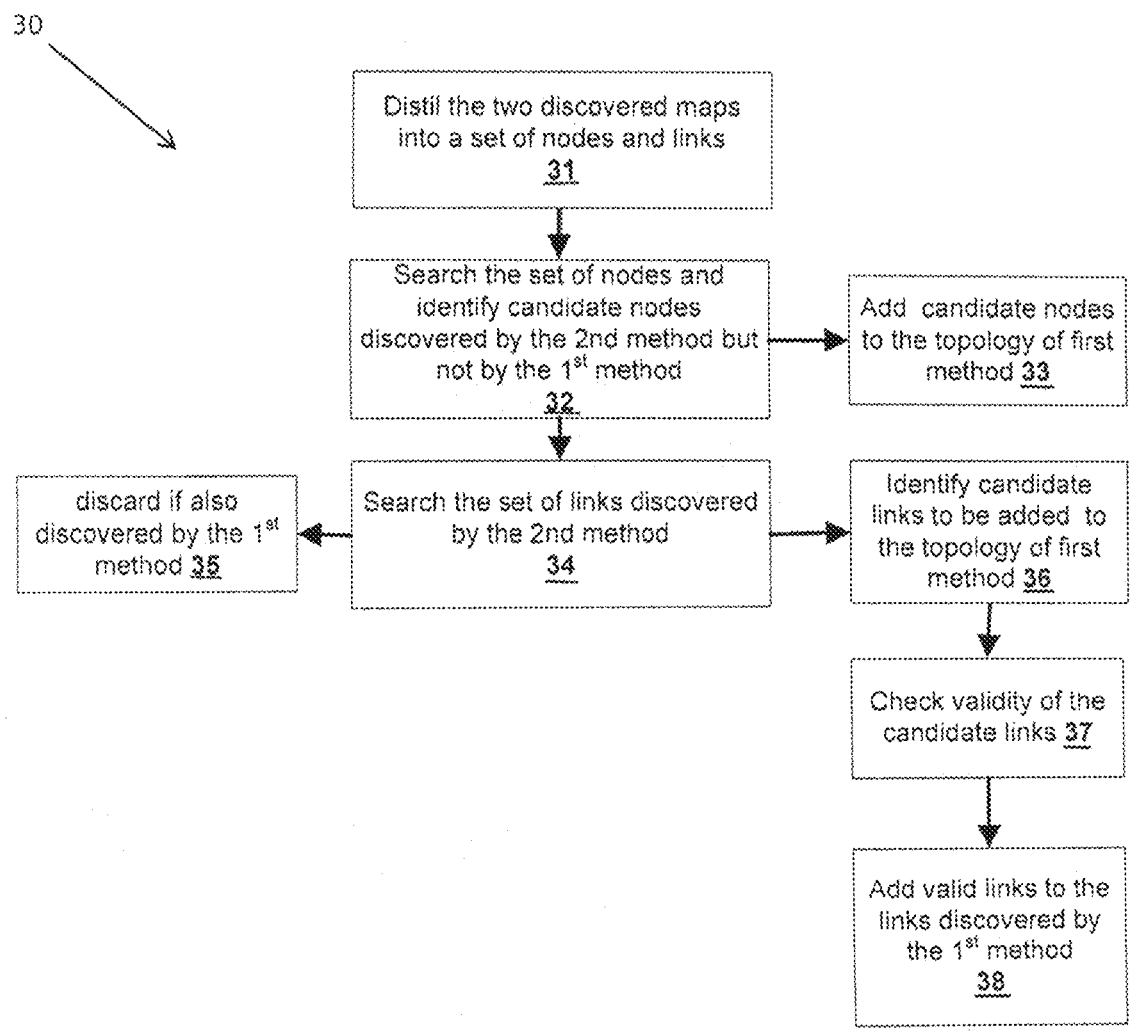
FIG. 2a illustrates an example of merge/deduplication process for Layer 3 topology discovery.

In steps 10 and 20, two different approaches are used to discover the Layer 3 network topology. The first method 10 uses route analytics, based on information from routing protocols, that is a more sophisticated technique (e.g. as taught in the U.S. Pat. No. 7,636,318). The second method 20 involves "walking" through the network to determine the topology, using data extracted either from SNMP or from Telnet/SSH/CLI login to a router (e.g. as taught in the U.S. Pat. No. 8,543,681). In step 30 the two Layer 3 mapped topologies are to be merged and deduplicated as each method may discover a different topology. According to one embodiment, illustrated in FIG. 2a, the merger/deduplication step 30 may be executed as follows. First, the two discovered Layer 3 topologies are distilled into a plurality of nodes and links 31. Nodes are identified by router IDs and links are identified by IP addresses on each end. In case of any conflict between the topologies discovered by method 10 and method 20 we assume that the topology discovered by method 10 is accurate always. Second, the set of nodes discovered by method 10 and method 20 are searched and candidate nodes are identified 32 which are discovered by method 20 but are not present in the method 10 topology. These nodes, labeled as candidate nodes, are then added 33 to the discovered topology of method 10. Third, a plurality of links discovered by method 20 is searched 34 and compared with the links discovered by method 10. Any links from method 20 which are existent in the topology from method 10 can be discarded 35, hence removing the duplications. They do not need to be added again. Method 20 Links that are not present in the method 10 topology mapping are candidates to be added 36. To determine if the method 20 links can be added to the deduplicated topology, the routers may be cycled through to extract the interface tables for each router 37. SNMP may be used to find the interfaceIndex which matches the links local IP addresses. Finally, the route analytics topology (method 10) is cycled through and for each router ID a list of valid interfaceIndex is extracted. If the method 20 index matches the interface index for method 10 the link is considered a valid new link which can be added to the topology 38.

Figure 4:
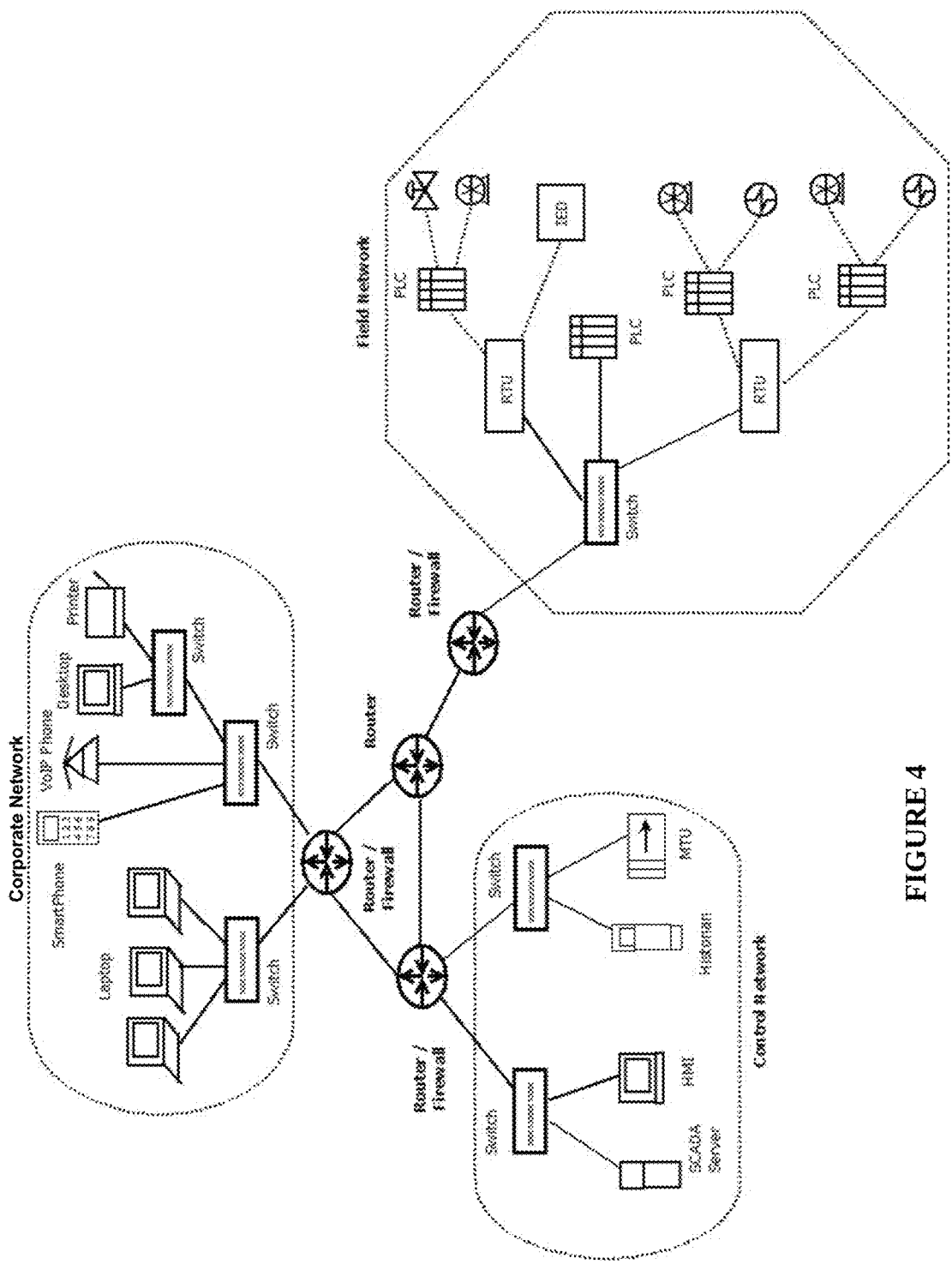
FIG. 4 illustrates an exemplary SCADA Network to be discovered.

FIG. 4 shows an exemplary SCADA network. To illustrate steps of discovery of the Layer 3 topology as described above, in a way of example, the following steps are taken. According to step 10, route analytics is used to discover and map the Layer 3 topology. In this step, for example using standard Route Analytics technology based on the OSPF or ISIS protocols, the routed SCADA network connectivity map is discovered by examining the Routing Protocol. At the end of step 10, the discovered SCADA network map in this example resembles the network in FIG. 4a. It may be noted that only three routers in FIG. 3 have been discovered.

The second method 20 is then used to discover parts of the routed SCADA network which were not discovered via route analytics. The second method 20 is an SNMP based method which examines routing tables and next-hop tables on the routers. In addition or in replacement it may also utilize SSH/CLI login to each router to discover its routers and then use a network-walk approach to determine the topology. Regardless of the approach used, a second mapping of the SCADA routed topology is obtained. In the case of the network of FIG. 4, in this example, this step discovers a part of the network depicted in FIG. 4b.

Figure 4A:
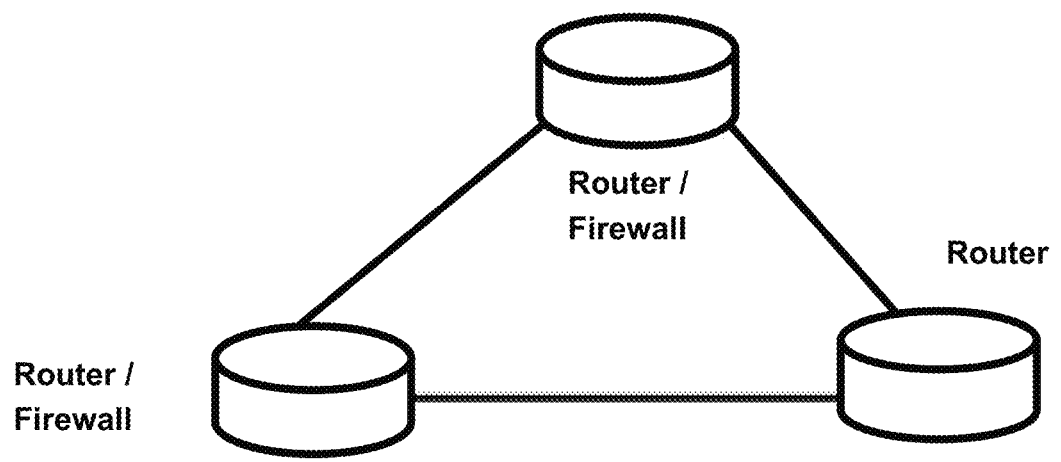
FIG. 4a illustrates a discovered Layer 3 topology of the network of FIG. 4 at end of the first mapping.
Figure 4B:
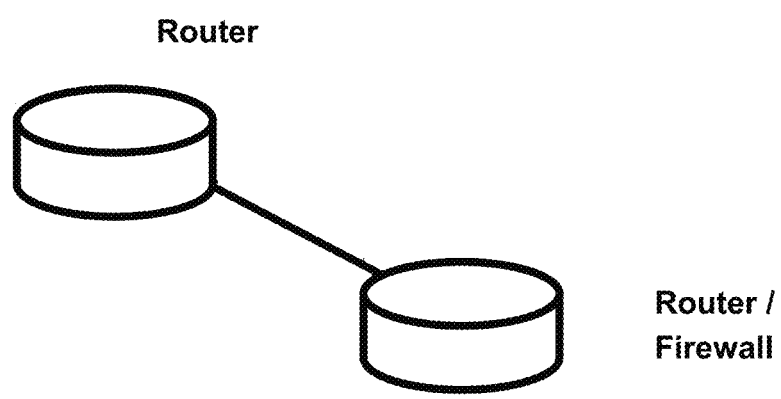
FIG. 4b illustrates a discovered Layer 3 topology of the network of FIG. 4 at the end of the second mapping.
Figure 4C:
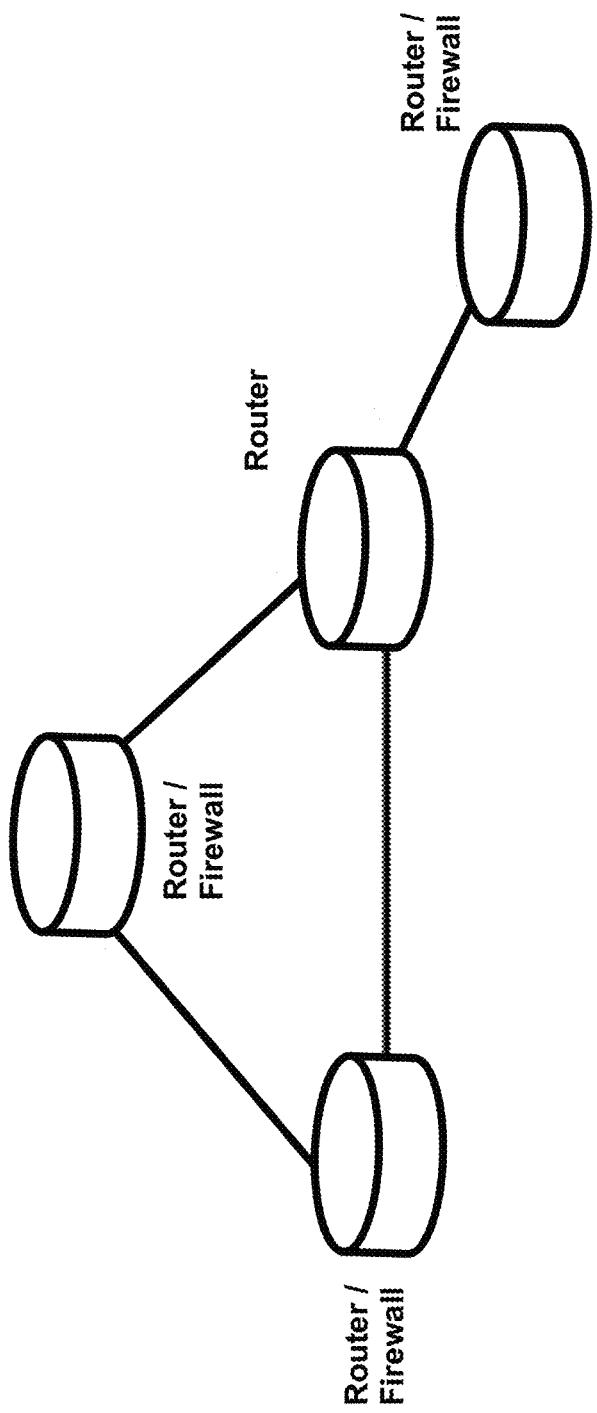
FIG. 4c illustrates the fully discovered Layer 3 topology of the network of FIG. 4 after merge and deduplication of the two mappings.

In the merger/deduplication step 30, the Layer 3 SCADA network topology is improved by merging and de-duplicating the topologies in FIGS. 4a and 4b to obtain the final topology shown in FIG. 4c. This example is provided to merely illustrate what occurs, following steps 10 to 30 of the embodied method. Otherwise, the same procedure is applicable to complex networks.

As illustrated in FIG. 4c, at the end of the merger/deduplication step 30, the full map of the Layer 3 network topology for the SCADA network is discovered. The topology of the remaining part of the network which is closer to the edge, i.e. the industrial Ethernet switches and end systems on the SCADA network such as the PLCs, can then be discovered. This is where the vast majority of the network devices reside.

At the output of step 30 the resultant topology of the Layer 3 network has been discovered and is available, including a set of routers and associated links between them. One significant consequence of this step, as will be elaborated upon further below, is reduction of the search space for live IP addresses by a factor of 10 to 100—a huge reduction in the time to discover the network. Fundamentally, this approach exploits the hierarchical nature of IP networks. It uses the Layer 3 topology discovered in step 30 as the means of achieving this reduction. From the Layer 3 topology, it is known that a set of valid subnets (including live devices in a subset of the IP address space) actually exist containing Layer 2 devices. As such, only devices on the valid subnets need to be discovered, thus reducing the search space and time by a factor of 10 or greater.

Figure 5:
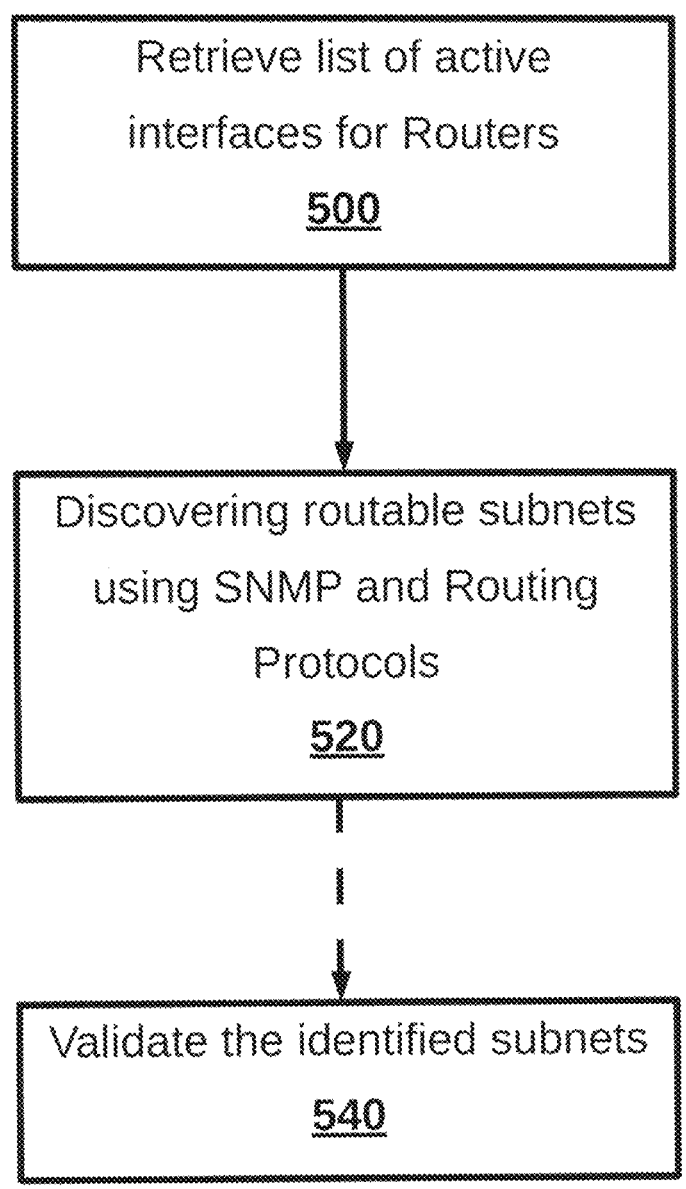
FIG. 5 illustrates steps of identifying live subnets in Layer 2.
Figure 6:
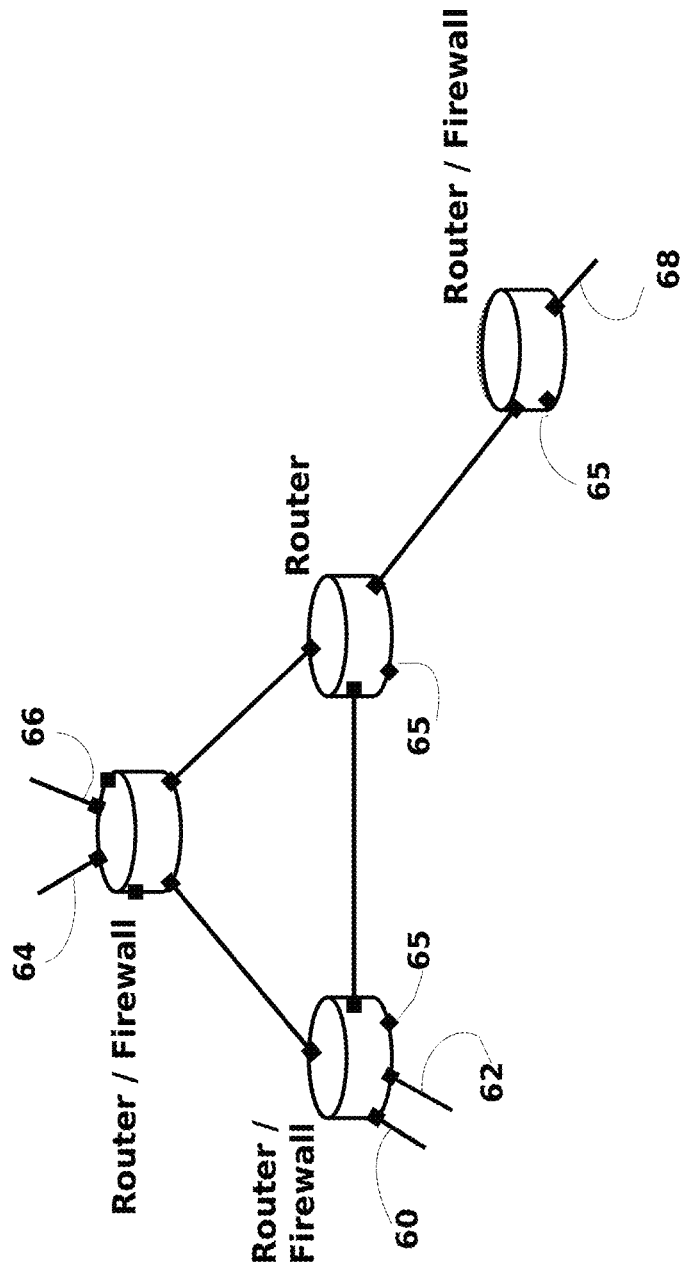
FIG. 6 illustrates identified subnets associated with the routers in the example of FIG. 4 with a plurality of active interfaces and a plurality of non-active interfaces.
Figure 6A:
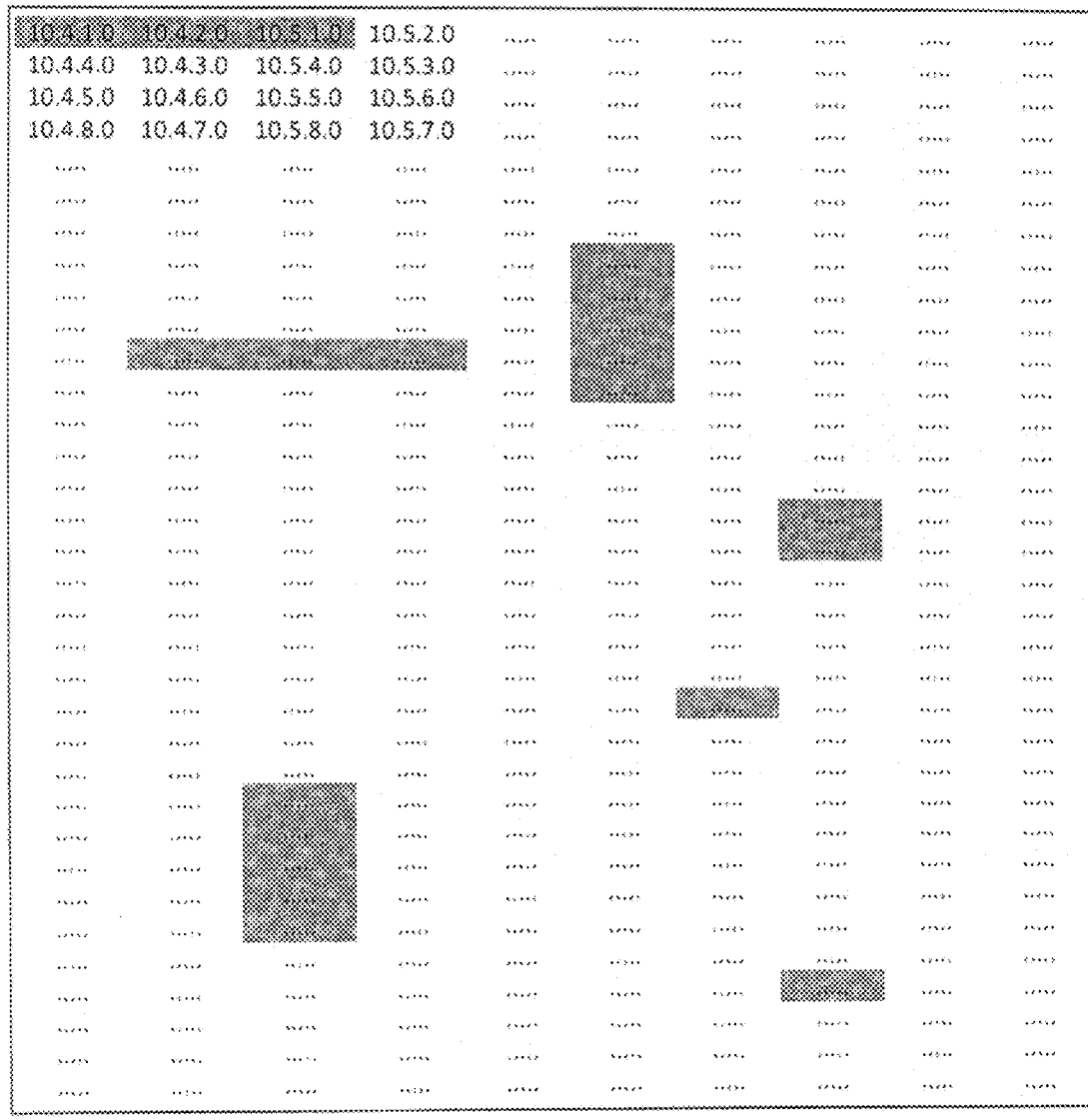
FIG. 6a illustrates an exemplary IP Address Heat Map.

In preparation for the Layer 2 discovery 40, in one embodiment and referring to FIG. 5, the list of active interfaces is retrieved for each of the routers 500 discovered in the Layer 3 topology 42; and routable subnets are discovered and identified for interfaces where they exist, using a combination of information from SNMP and the Routing Protocol 520. The associated valid Layer 2 subnets for the routers are identified from these interfaces. It is important to confirm the validity of the identified subnets 540. In one embodiment, that is achieved by correlating this information against the discovered routed topology. VLAN data is retrieved from the router to determine if sub-interfaces exist and are configured. Then, the set of candidate interfaces is determined which are connected to Layer 2 SCADA networks. Device discovery will be carried out on these interfaces. While majority of the Layer 2 subnets and devices will exist at the edge of the Layer 3 topology (i.e. as leaves in a topology tree), some Layer 2 subnets and associated devices will exist between two routers. In this scenario, a straight connection or link between two routers in the Layer 3 topology may actually consist of one more switches which interconnect the two routers and then also serve to provide connectivity for other end systems. According to this embodiment, such Layer 3 subnets would be identified as valid candidates for expanded Layer 2 discovery. FIG. 6 shows identified subnets associated with the routers in the example of FIG. 4. In this example, 60, 62, 64, 66, and 68 are interfaces with active subnets; while interfaces 65 are interfaces with no active subnets. At this stage 42 the search space is reduced and active subnets in Layer 2 are identified. FIG. 6a illustrates an example of such search space reduction in an IP address Heat Map that represents the IP address space allocated to an exemplary organization using a form of fractal mapping to preserve grouping of addresses. In other words, consecutive strings of IP addresses will visually translate to compact regions on this map. Each of the numbered "cells" or blocks in the map represents a /24 subnet containing all the IP addresses starting with the subnet number. While traditional network mapping & topology discovery solutions will search the entire address space for the organization to find the Layer2 subnets which have active devices, the presenting embodied method of this invention will quickly find those shaded cells in the map and focus discovery of active devices only on the limited search space represented by the shaded cells, resulting in a fast discovery.

To discover the set of devices on the network in step 44, first, active or non-silent devices on "live" subnets are discovered. This includes devices such as servers, hosts, PLCs, RTUs, Industrial Ethernet Switches etc. Detection of non-silent devices is achieved via probe packets. Low volume probe packets (conceptually similar to Ping packets) are sent to scan the IP range for the subnet in question. Often these are /24 subnets with a maximum of 255 IP addresses, bounding the range, number and time it takes to send probe packets. IP addresses that respond are identified as live devices. As some devices don't respond to Ping packets, a diversity of packets may be required in order to reach different types of devices. In some cases, for example, packets representing SCADA protocols (Modbus, DNP3, etc) are sent to elicit responses from industrial control end systems.

The above approach discovers many devices on the network but does not discover silent devices. Some devices don't respond to ping or active probe packets for security reasons. For example, some servers or firewalls are configured not to respond to ping packets. The presence of "silent" devices is a phenomenon that is true for IT networks in general. In the case of SCADA networks, many additional devices may not respond—for a diversity of reasons.

To discover silent devices in step 44, inference methods are used. Referring back to FIG. 3 and in accordance with one embodiment, a first inference method passively monitors network traffic data 300. Network traffic-flow information (e.g. from Netflow or raw packet streams) is analyzed to find IP addresses of devices that are either sending or receiving traffic. The data is distilled into flows to identify traffic between two devices. Each flow is analyzed and devices internal to the network are identified (by their IP addresses). Sending a packet from a source to a destination will create a "traffic flow" as observed by a flow monitoring module. However, this does not mean that the destination actually exists. It may have been spoofed. To reduce the false positives, specific constraints are used to validate that the flow data legitimately represents a particular sender/receiver. According to one embodiment, the validation includes sub-steps of: ensuring a corresponding bi-directional flow exists that carry traffic in the reverse direction; and for TCP, verifying that the initial handshake is completed and traffic exchanged; and verify timing alignment of the bi-directional flows. Verification of timing alignment for TCP flows involves a number of steps including, but not limited to, the following: (a) Identify two traffic flows (Flow 1 and Flow 2) that appear to be bi-directional traffic flows as identified by a common 5-tuple (source/destination IP addresses, source/destination ports and protocol) (b) Verify that the start time of Flow 1 is not before the start time of Flow 2 (Flow 1 will contain the SYN flag) (c) Verify that the end time of Flow2 is not before the start and end times of Flow1. Traffic not meeting the above criteria is deemed unverified and discarded.

A second specific inference method is utilized to learn about additional silent devices which may not have been identified via the traffic flow method. Routers and tables have a diversity of tables which contain information. In other words, by examining information available from the Layer 2 or Layer 3 switches and/or Routers we infer the existence of additional other devices on the network 350. These additional devices may be obtained by using SNMP or CLI to examine, for example, the following tables on Industrial Ethernet Switches: (a) Address Resolution Protocol (ARP) Tables—these tables contain IP to MAC address mapping (b) Address Forwarding Tables (AFT)—these tables indicate which MAC addresses were visible on a given interface/port of an Ethernet switch. They are used by the switches for address forwarding. This second inference method may be carried out before or after the device classification step below.

Following the first and/or second inference methods, a set of silent and non-silent devices are now identifiable by their IP addresses. However, for the most part, it is not known what type of devices they are. While the routers are known, for the rest of the devices in the network, it is not known what type of device each live IP address represents. Further analytics are required to fingerprint/classify the device that is described in step 46 below.

Following the device classification 46, the type of devices will be known, e.g. which devices are switches, routers or different types of end systems. One aspect of device auto-discovery is the classification of the devices on the network, e.g. SCADA devices. According to a preferred embodiment, the methods described herein are utilized to identify SCADA specific devices on the network. However, the method can also be applied to identify a number of non-SCADA devices present on the network.

Classification and/or fingerprinting a device on a network is a challenging task. As prior research has shown, devices such as PLCs are extremely sensitive to unexpected network traffic. Running a tool such as Nmap to carry out a network-wide scan on PLCs in a production manufacturing plant has resulted in a robotic arms swinging wildly. As such, the following requirements have been taken into account to carry out an efficient classification:

(i) put as little load as possible on the network;
(ii) treat end-devices such as PLCs with great care when interrogating them;
(iii) use passive techniques as much as possible; and
(iv) use inference where possible.

Device fingerprinting approaches that are typically used in network scanning tools for IT networks employ an active scanning approach where they send out probe packets of different kinds. This approach can identify not only the device types but also operating systems and TCP stack versions which are present on a particular device. While active fingerprinting can be carried out, it should be noted that such approaches can cause undesired and harmful effects on the devices that control physical processes. In some cases, active probing or scans may cause PLCs to consider the probe as legitimate control traffic and set certain register values which may lead to opening of a valve or moving a robot arm. In other cases, PLCs which may have resident software developed long time ago on old hardware have been known to reboot when a certain number of probe packets are sent to them in sequence Instead, the utilized device discovery may incorporate a passive device fingerprinting scheme which employs multiple techniques for determining the type of the network devices. In general, on their own, no classification method is able to identify/classify devices with 100% accuracy. In one embodiment of the present invention, final determination of the device type has been made by applying data fusion to the outputs of multiple discovery methods to increase the overall certainty and accuracy of the device classification.

Figure 7:
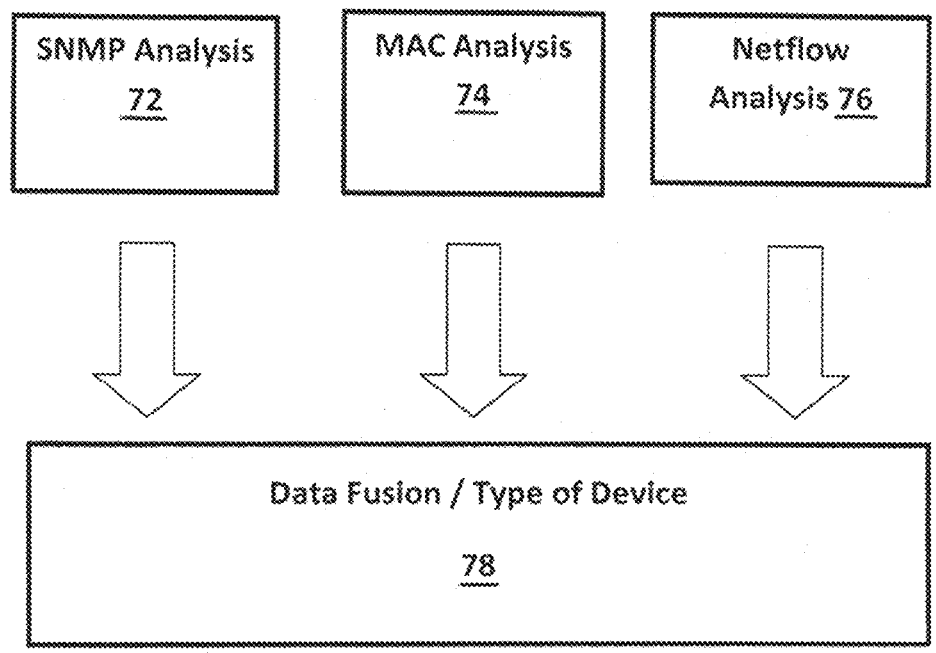
FIG. 7 illustrates a SCADA device passive fingerprinting procedure.

Accordingly, as illustrated in FIG. 7, SCADA device classification or identification is carried out by:
(i) utilizing multiple passive-based classification methods (e.g. a combination of SNMP analysis 72, MAC analysis 74, Netflow analysis 76);
(ii) associating different certainty and truth levels with the results of each method; and
(iii) applying a data fusion 78 approach to make a decision about the type of device.

This approach increases the accuracy of device classification and/or identifications. Otherwise, each of the individual methods (e.g. SNMP analysis 72, MAC analysis 74, Netflow analysis 76) on their own have limited levels of accuracy. None of them are 100% accurate for all devices. Previous studies (e.g. D. Formby, et. al.) have shown the limitations of existing passive techniques to provide accurate fingerprinting of SCADA devices. The authors observations from tests carried out indicate that accuracy may vary from 20 to 90% depending on the vendor, age and type of deployed SCADA device.

In a preferred embodiment, at least two of the three SNMP analysis 72, MAC analysis 74 and Netflow analysis 76 techniques are used to fingerprint devices. SNMP analysis 72 involves extracting information from SNMP to determine the SCADA device type and vendor (e.g. to identify a device as being a PLC/RTU from Allen-Bradley®). To achieve this, we rely on the insightful observation that some PLCs support SNMP and the system description field in SNMP includes a string from which a predefined set of keyword combinations can be scanned/extracted to extrapolate the device type and vendor. However, in test bed and real-world deployments it has been observed that a number of PLCs do not have SNMP enabled. Further, those that have SNMP may not always have the correct Object Identifiers (01D) populated making it extremely challenging in such cases to obtain accurate device classification. Finally, the non-standard use of the System Description field ensures that different vendors put different amounts of detail or information in this field. As a result, SNMP analysis only yields the correct results in certain instances while in other instances it returns a partially accurate result.

MAC analysis 74 uses examination of MAC addresses to extract Organizationally Unique Identifiers (OUI) and reverse-map types of devices depending on vendors. For some devices, knowledge of the vendor is extremely helpful in identifying the type of device. For other devices, this is not the case. For example, if the MAC address indicates that a particular device is from Cisco®, it is unclear whether the device is a router, switch or IP phone. However if the MAC address indicates that the device is from Allen-Bradley®, there is a much stronger certainty that it is an industrial control device such as a PLC.

Netflow analysis 76 uses examination of Netflow records to identify active ports and services on a particular IP address. While Netflow records by themselves do not classify a device, knowledge of supported services lend credence to being a specific type of device. For example, IP phones, printers and laptops are generally not expected to run the same protocols as a PLC would run. It is noted that Netflow traffic captures information about traffic flows on the network. Each traffic flow is identified by a 5-tuple (source IP address, destination IP address, protocol, source port and destination port). Using Netflow to extrapolate device types relies on the fact that in general, services and protocols are tied to specific ports by the IETF standards. As a result, protocols run on well-known or designated ports (eg. 502 for the Modbus SCADA protocol, and 44818 for EtherNet/IP SCADA protocol). Devices communicating on certain ports give a clue into the device type. Smart phones may communicate regularly with a designated set of servers through their applications or operating system. Both IP addresses and port numbers recorded in Netflow records may be used to help identify device types. For example SCADA devices can be determined with reasonable certainty based on communication on designated ports, while VoIP phones can be discovered based on communication with specific hosts and use of certain protocols such as SIP. This technique is also proven useful in finding other devices such as smart phones. Devices that were discovered included PLCs, HMI, Printers, VoIP Phones, VoIP PBX and Smart Phones. To make the Netflow analysis 76 approach robust, it is not sufficient to examine a single traffic flow. Both the forward and reverse direction traffic flow should be examined to make sure the devices are responding to requests and the traffic flow in one direction is not just a set of scanning probe packets.

Pre-assigned certainty levels are relied on for each of the different methods of classifying a particular device. Examples of these pre-assigned certainty levels are provided below, noting that the figures listed are for illustration only. In one example, for Cisco® devices, the OUID gives 25% chance of being a router, 25% chance of being a switch, 25% chance of being an IP phone, a 15% chance of being a firewall and 10% chance of being a wireless access point. In another example, for Cisco® devices, the System Description field is informative in most cases relying on its answer with 75% certainty. In yet another example, devices running Modbus on the assigned server port can be considered PLCs with 75% certainty while devices running DNP3 SCADA protocol on the assigned port can be considered PLCs with 65% certainty.

Referring back to FIG. 7, to arrive at a confidence level associated with the classification output for the type of device, data fusion 78 is utilized to apply certainty levels against the outputs of each of the at least two classification methods. There is no mandate to apply a particular data fusion scheme. A weighted fusion algorithm may be utilized to do the task. Or alternatively, other algorithms such as Bayesian fusion or Dempster Schafer fusion can be utilized. The main consideration is that the fusion algorithm combines uncertainty levels with outputs to arrive at a single certainty level for the type of device. The goal of a strong fusion technique is to classify discovered devices with high certainty.

Accordingly, data are fused from multiple distinct approaches to classifying devices. In one exemplary embodiment, three specific approaches each with varying levels of certainty and accuracy are used for the purpose of illustration. Other approaches could be used or added. By combining the different methods, one gains a higher confidence in the results of the device classification. The three exemplary methods are: (i) SNMP-based analysis 72 (ii) MAC analysis 74 (iii) Traffic Flow analysis 76 (e.g. Netflow). Table 1 illustrates some key principles which inform the data fusion in the way of examples:

TABLE 1

| | SNMP | MAC | Flow (Netflow) | Comments |
|---|---|---|---|---|
| 1 | 1 | 0 | 0 | If SNMP is supported by the device and the System Description field is accurately populated on the device then classification and finger printing is more than 90% accurate. In such cases the input from the other classification/fingerprinting techniques (ie MAC address and/or traffic flow classification approaches) are not as important. |
| 2 | 0 | 1 | 0 | In another example, the device does not support SNMP and the flow classification approach is inconclusive. One thus relies on the MAC address approach. In general, the MAC address approach only provides the company that manufactured the device and not the device type. Some companies may only make a certain type of device. eg 90% of Allen-Bradley ® devices are PLCs. Another company which makes 3 types of devices (eg router, switch, PLC) may have a 33% chance that the MAC address represents one of those devices. Thus, the accuracy for selecting one of those candidates as a device type is only 33%. |
| 3 | 0 | 1 | 1 | In another example, the device does not support SNMP but flow classification does yield information about the device type. For example, in SCADA networks, flow-based classification may have high accuracy rates due to the fewer number of protocols and device types deployed. From the traffic flow port number, one can infer if a device is running network protocols specific to PLCs (eg MODBUS or DNP3) and hence the device can be characterized as a PLC with high certainty. |

It is worth noting the following about the different methods independent and prior to fused classification. If SNMP is enabled and the System Description field is filled in, then SNMP classification is quite accurate—estimated at 90% accuracy or higher. The challenge however is that SNMP is not always supported on devices and the System Description field is not always filled in. The SNMP deviceType field can also be relied on although experience in the field suggests it is not always populated correctly. MAC addresses are always known for the device being classified. The level of accuracy depends on how many different types of devices a vendor might make and apriori knowledge of which ranges of MAC addresses are used for which types of devices. Flow based classification has higher accuracy in some cases and lower accuracy in others. Two exemplary scenarios where flow classification has lower accuracy include cases where (a) The port number changes with various data transfers e.g., streaming applications and (b) traffic is tunneled (e.g. over video over HTTP). As SCADA networks rarely encounter such situations, flow based classification in SCADA networks can have high accuracy.

According to an exemplary embodiment, the data fusion for the mentioned three methods may be implemented as follows: (i) For each of the three methods (MAC, SNMP, Flow) assume the classification outputs for each method results in a table which indicates that device could be one of a number of different kinds with a certain probability; (ii) no priority is given to the output of any of the three methods. Each one contributes equally to the final decision; (iii) a fused probability is computed for each of the different possible device types based on the decision/accuracy of each individual method. The device type possibility with the highest probability is assigned as the device type for the device. These steps have been applied using a table such as table 2 with noted probabilities and an example fusion combination formula:

TABLE 2

| Device Type | Probability of Device Type based on SNMP approach | Probability of Device Type based on MAC approach | Probability of Device Type based on Flow approach | Device Type Probability |
|---|---|---|---|---|
| Router | RP-S | RP-M | RP-F | 1-(1-RP-S)*(1-RP-M)(1-RP-F) |
| PLC | PP-S | PP-M | PP-F | 1-(1-PP-S)*(1-PP-M)(1-PP-F) |
| VoIP PBX | VP-S | VP-M | VP-F | 1-(1-VP-S)*(1-VP-M)(1-VP-F) |
| iPhone | IP-S | IP-M | IP-F | 1-(1-IP-S)*(1-IP-M)(1-IP-F) |
| Switch | SP-S | SP-M | SP-F | 1-(1-SP-S)*(1-SP-M)(1-SP-F) |
| HMI Server | HP-S | HP-M | HP-F | 1-(1-HP-S)*(1-HP-M)(1-HP-F) |
| VoIP Phone | OP-S | OP-M | OP-F | 1-(1-OP-S)*(1-OP-M)(1-OP-F) |
| MACBook | MP-S | MP-M | MP-F | 1-(1-MP-S)*(1-MP-M)(1-MP-F) |

Other formulas may also be used to estimate the device type probability depending on the type of the fused methods and way of combining them.

The final device type in the above would be the formula which has the highest probability for the device type. To illustrate this by way of example, consider a specific example with the passive classification of a single device on the network, where:

SNMP—the system description field is not populated and the SNMP device type field for the classification is relied on. This field can only indicate that a device is a router, switch or end system. It cannot indicate whether it is a PLC or MACbook etc.

MAC address—the probabilities for table 2 are populated based on knowledge of the specific vendor. For example if the vendor is Allen-Bradley®, then there is a high chance the device is a PLC (e.g. 80%) and a low chance it is a switch (e.g. 10%). However, it is very unlikely it is a VoIP phone or PBX. Alternatively, if the vendor is Cisco®, the device could be a router, switch, VoIP pbx or VoIP phone. However, it cannot be a HMI server or MACbook. Likewise if the vendor is apple, then with strong probability it can be a macbook or iphone but it is not a generally a router or switch. Example probabilities for a MAC address which was shown to be a Cisco® device is captured here.

Flow—the probabilities for the flow approach require a pre-fusion stage as part of the approach. For example, if the traffic flow information shows that the device is generating/receiving SCADA protocols then it is considered a PLC with high probability (e.g. 90%) and unknown the rest of the time. If on the other hand, the traffic flow information shows VoIP protocols running then there is a 20% chance it is a PC with a softphone and a 70% chance it is a VoIP phone and a 10% chance it is a PBX. If the device is communicating with a destination IP address from known update servers and downloading data, this will also contribute to the decision. eg Android®, Iphone®, Linux® etc.

Table 3 presents very specific example values, for the purpose of demonstration, where device type probability is calculated based on the formula in last column of table 2. Accordingly, the device is classified as a router as it has the highest probability in table 3.

TABLE 3

| Device Type | Probability of Device Type based on SNMP approach | Probability of Device Type based on MAC approach | Probability of Device Type based on Flow approach | Device Type Probability |
|---|---|---|---|---|
| Router | 50% | 40% | 0% | 70% |
| PLC | 5% | 0% | 0% | 5% |
| VoIP PBX | 5% | 5% | 0% | 10% |
| iPhone | 2% (iphones don't have SNMP) | 5% | 0% | 7% |
| Switch | 30% | 25% | 0% | 47.5% |
| HMI Server | 2% (HMI servers don't have SNMP) | 0% | 0% | 2% |
| VoIP Phone | 2% | 5% | 0% | 7% |
| MACBook | 1% | 0% | 0% | 1% |

Figure 2B:
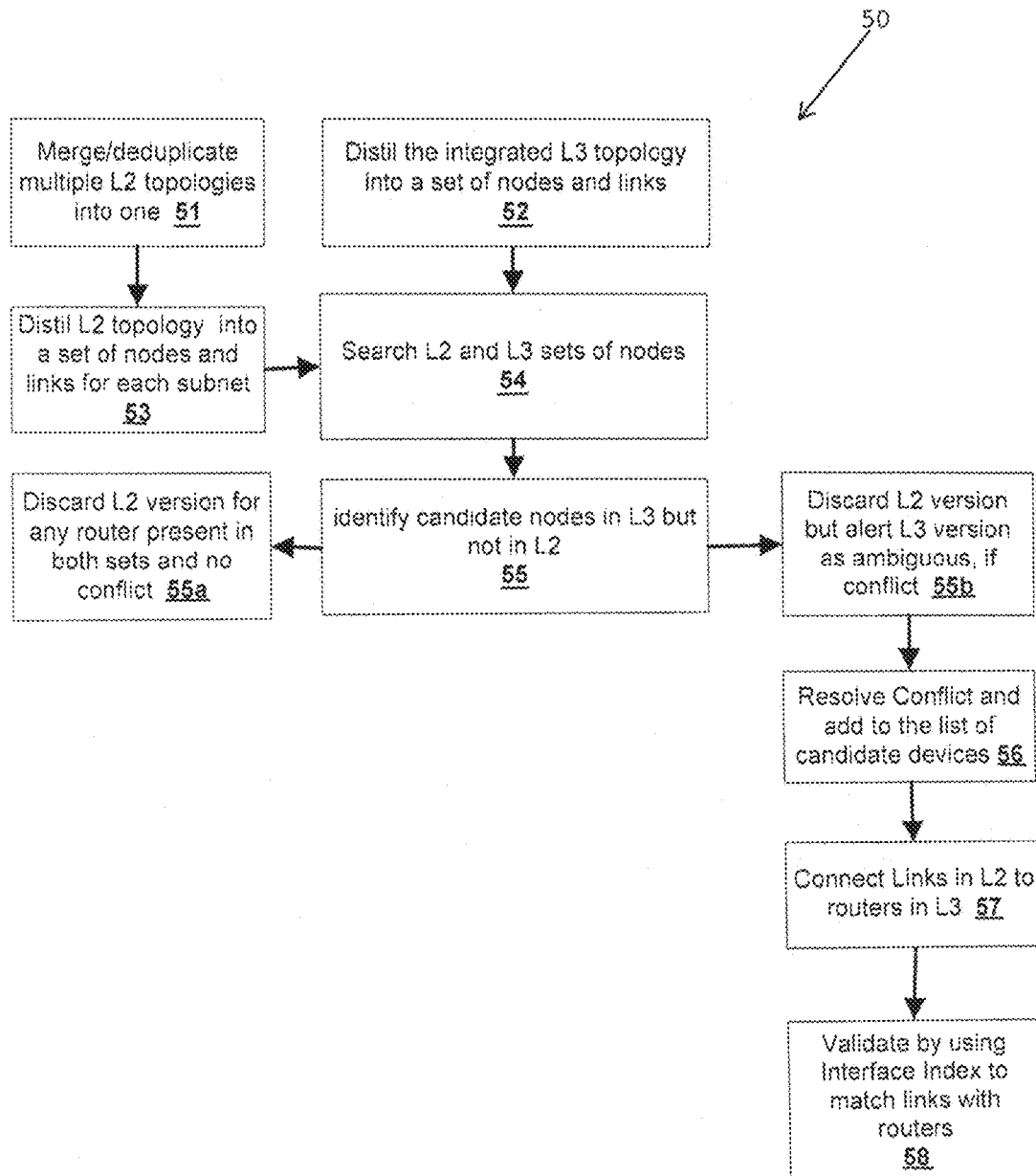
FIG. 2b illustrates an example of merge/deduplication process for a complete Layer 2/3 topology discovery.

When all the Layer 2 devices on the identified subnets are classified and/or identified, a full mapping of Layer 2 is obtained and the Layer 2 topology is discovered for each subnet 48. The final step of the process is merger and deduplication of the combined Layer 2/3 topologies to create a final integrated topology of the network 50. In one exemplary embodiment, referring to FIG. 2b, the merger/deduplication step 50 of Layers 2 and 3 has been executed as follows. The Layer 2 topology may have been discovered using multiple different methods, e.g. using the Address Forwarding Table (AFT) method or via the Spanning Tree (STP) method or via LLDP (Link Discovery Protocol) method or via CDP (Cisco® Discovery Protocol). Multiple topologies so obtained are first merged and deduplicated into a single Layer 2 topology for each subnet 51. Next, this single Layer 2 topology is merged and deduplicated with the Layer 3 network topology as follows. First, distill the integrated Layer 3 topology into a set of nodes and links 52. Label these as L3 topology. Nodes are identified by Router Ids and Links are identified by IP addresses on each end. Second, Distill the Layer 2 topology for each subnet in the network into a separate set of nodes and links 53. In this topology, routers, switches and end systems are identified by management IP addresses. Links on a switch are identified uniquely by the switch IP address and an Interface Index. Links on a router are identified uniquely by an IP address. Third, search the set of nodes discovered by the Layer 3 method and the Layer 2 method 54. Fourth, identify candidate nodes discovered by the Layer 3 method which are not present in the Layer 2 method 55. Label these nodes as candidates to be merged. For any routers which are present in both topologies, if there is no conflict, discard the Layer 2 version of the node in the topology 55a. If there is conflict (for example if the number of interfaces do not match), discard the Layer 2 version of the node but mark the Layer 3 node as having ambiguity and generate an alert for the analyst to investigate 55b. Routers in a Layer 2 network may be identified by the IP address of the interface by which they connect to the Layer 2 subnet. This IP address may be different from the IP address used to identify the router by the Layer 3 topology (e.g. the Router ID) or IP address of a different subnet. As such, detection that the router is the same involves extracting an SNMP interface MIB from the Router and then searching for the IP address of the router interface in the Layer 2 topology. Cross-referencing is carried out to find the list of other IP addresses on that router to determine if any of them match the Router ID or IP address in the Layer 3 topology. Special attention is given to handle exception cases. For example a device may be detected as a router on the Layer 3 topology and labeled as a switch on the Layer 2 topology. As such the approach of the above described conflict resolution may need to be utilized to resolve such conflict as well 56. As the Layer 3 topology does not have switches or end systems, there is no conflict with these devices which exist in the Layer 2 network. As a result switches and end systems are added to the candidate device list for the integrated topology. Fifth, resolution of links needs to be done. Links in the Layer 2 topology need to be connected to specific routers in the Layer 3 topology 57. Finally, to determine if the Layer 2 links can be added to the deduplicated topology, cycle through the routers and extract the interface tables for each router. Use SNMP to find the interface Index. If the Interface Index matches the unique identifier for the link from the Layer 2 topology then the link can be added to the candidate link list 58. Proceed to add it to the topology.

Figure 8:
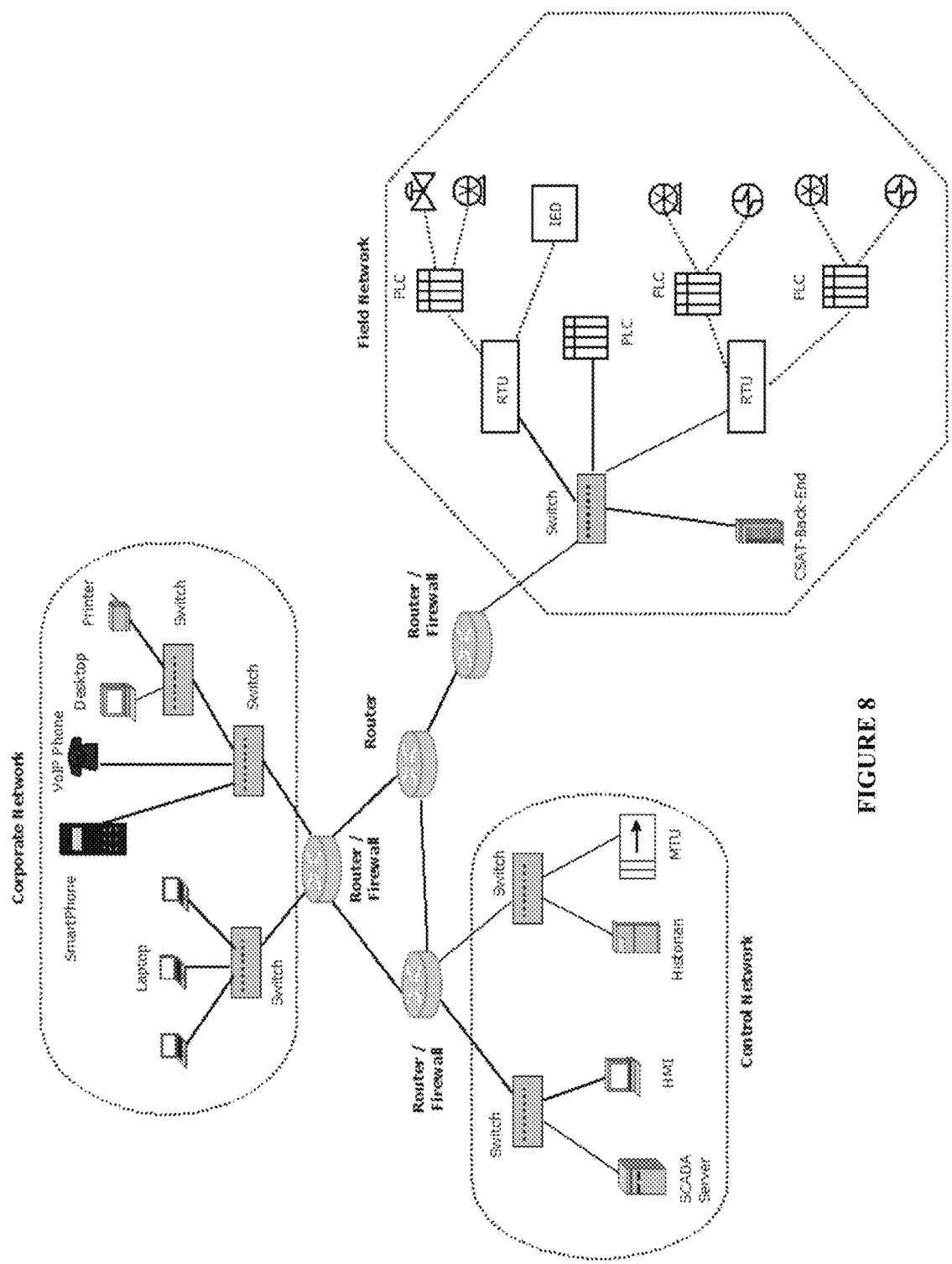
FIG. 8 illustrates a Discovered Network Map after device classification.

In the example in FIG. 3, the four router topology has been discovered in step 30. Then, five active subnets were detected in step 40. Subsequently, in step 50, the Layer 2 SCADA network map is discovered for each of the five subnets—resulting in the discovered SCADA topology depicted in FIG. 8.

Figure 9:
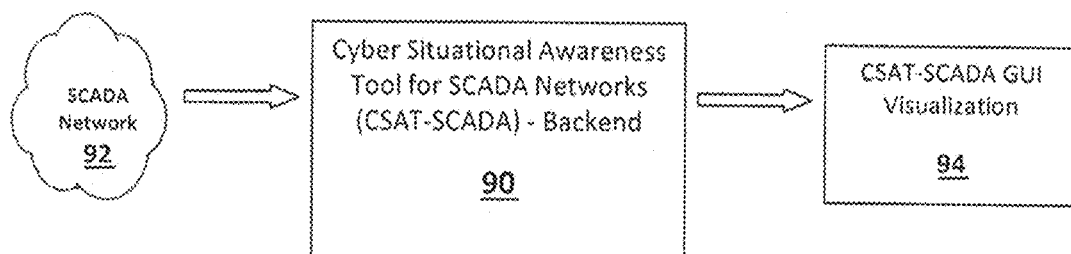
FIG. 9 illustrates a CSAT-SCADA (Cyber Situational Awareness Tool for SCADA Networks) Tool system.

Full and complete discovery of Layer 2/3 network topology and network map 50 lays the ground for several applications, such as monitoring the network for cyber security purposes. FIG. 9 illustrates a CSAT-SCADA (Cyber Situational Awareness Tool for SCADA Networks) system. In one embodiment, the CSAT-SCADA back-end 90 is deployed on the SCADA network 92 to learn the network topology of the industrial control network 92 and to detect cyber threats and build a situational awareness picture reflecting the network security posture. In another embodiment, the CSAT-SCADA back-end 90 may be complemented by a CSAT-SCADA front-end GUI 94 that is responsible for presenting the situational awareness information to the user by retrieving the distilled results from the CSAT-SCADA back-end 90.

Figure 10:
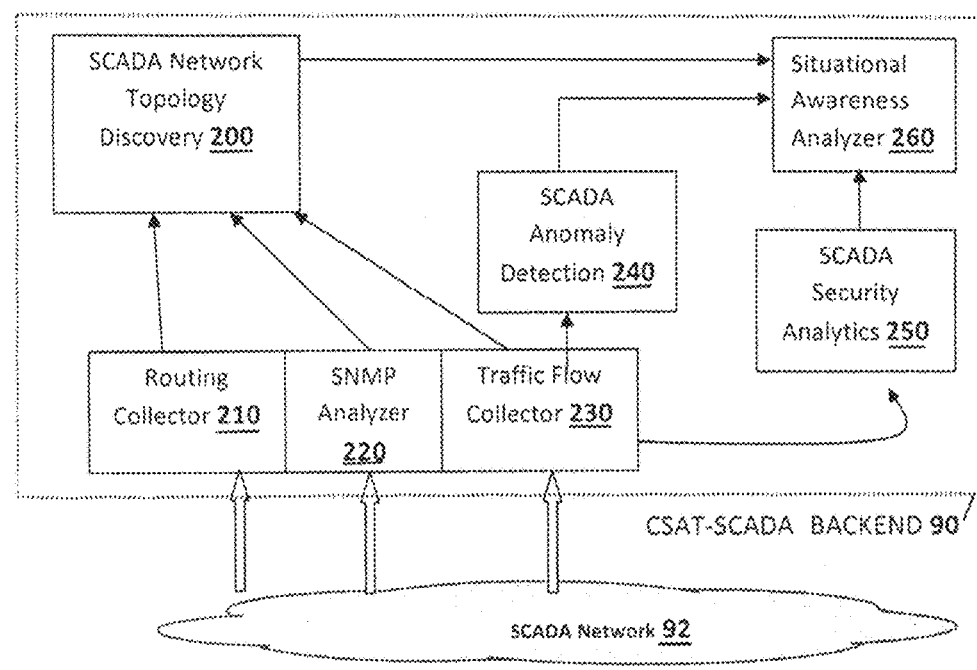
FIG. 10 illustrates an example of a CSAT-SCADA Tool Back-end Architecture.

Now referring to FIG. 10, an exemplary architecture for the CSAT-SCADA back-end tool system 90 is illustrated that may be implemented by various means, such as a computing device. The system 90 comprises a plurality of modules as follows. A Routing Collector 210 is responsible for passively obtaining routing protocol information from the network (e.g. OSPF data) and analyzing, extracting the information required for SCADA Network Topology discovery. A SNMP Analyzer 220 is responsible for obtaining SNMP MIB (Management Information Base) information from industrial Ethernet switches, PLCs, servers and other devices on the SCADA network. This information is also used for SCADA Network Topology discovery. A Traffic Flow Collector 230 is responsible for receiving and distilling traffic flow information in formats such as but not limited to Netflow or IPFIX. The collector receives information for every single traffic connection (flow or session) that is being monitored. A SCADA Network Topology Discovery Module 280 is responsible for discovering devices, on the SCADA network (including for example routers, switches, PLCS, RTUs, HMI, Historian, etc), fingerprinting these devices and applying algorithms to discover the SCADA network map, by employing techniques as described in a great detail in relation to the embodied method 100. It utilizes information from two or more of Routing Collector 210, SNMP Analyzer 220 and Traffic flow Collector 230 modules to accomplish this. Additional data classification modules may also be added to improve the accuracy of the discovery.

Further, a SCADA Anomaly Detection Module 240 monitors the traffic flow information and detects cyber threats by applying anomaly detection and machine learning techniques to statistics which it distills from the traffic flow information. A SCADA Situational Awareness Analyzer module 260 combines the SCADA network map obtained from the Network Topology Discovery Module 280 with the cyber threat information and security analytics to create a situational awareness view of the network posture. A SCADA Security Analytics module 250 applies analytics to traffic flow information to detect security threats not discovered using the anomaly detection module 240 and adds to the Situational Awareness Analyzer module 260. For example, this module may detect the presence of rogue DNS or DHCP servers.

Figure 11:
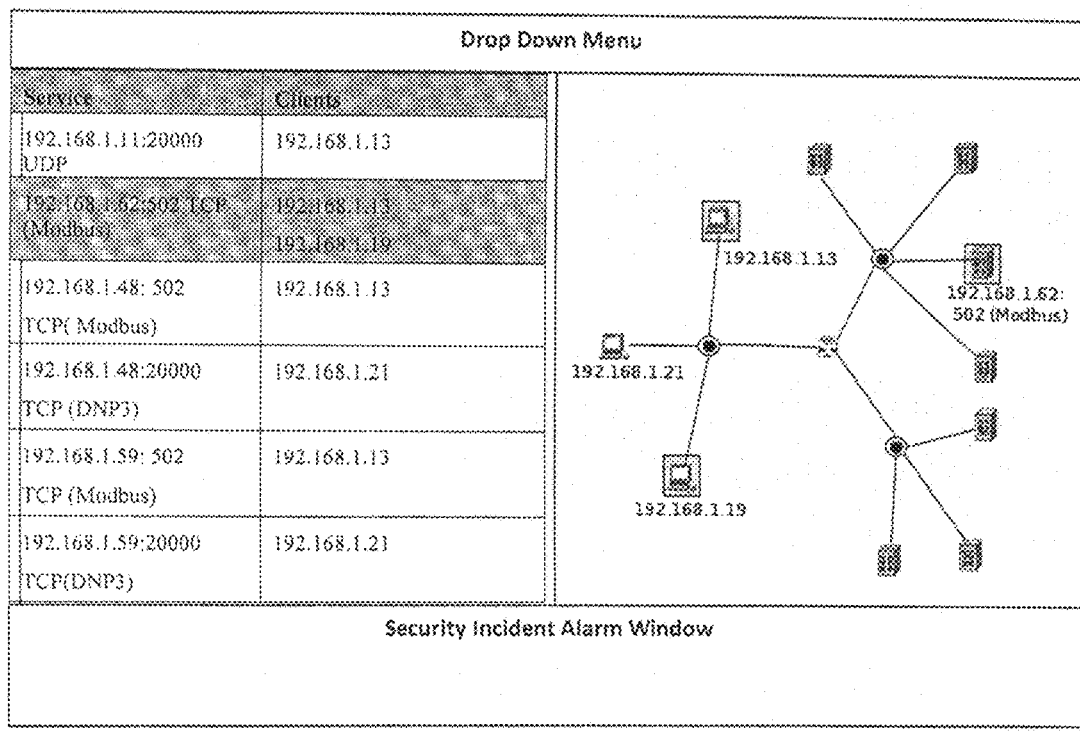
FIG. 11 illustrates a sketch of a CSAT-SCADA GUI.
Figure 12:
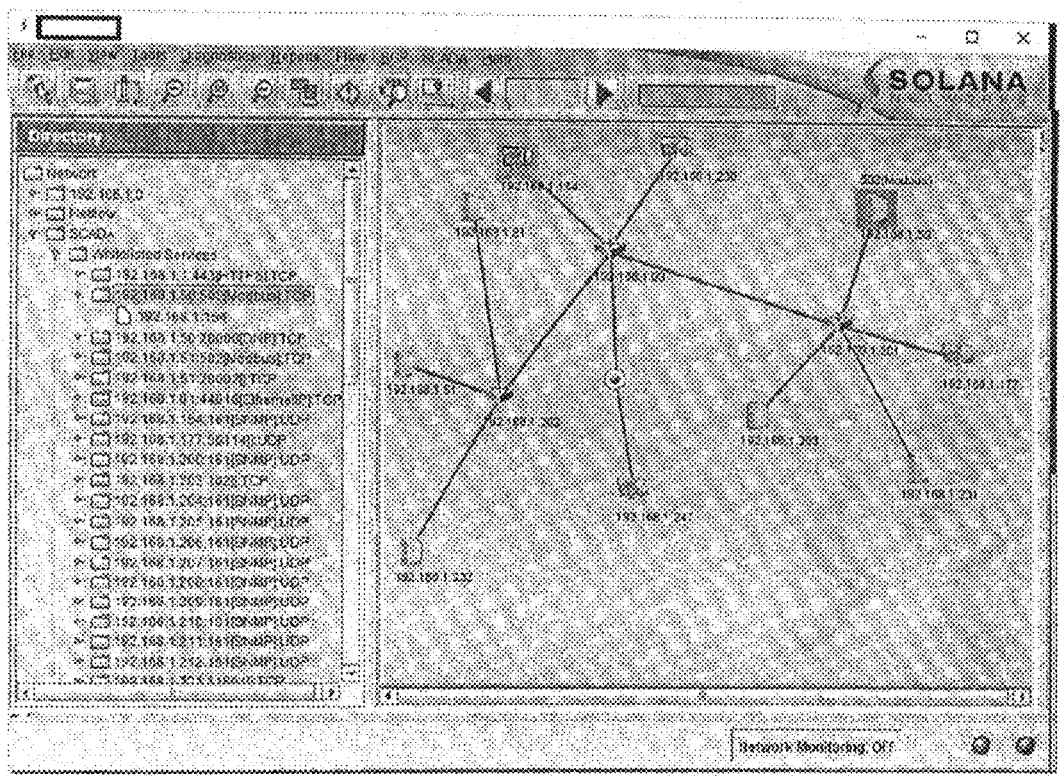
FIG. 12 illustrates an example of a CSAT-SCADA GUI.

FIG. 11 illustrates an exemplary sketch of the CSAT-SCADA front-end GUI 94. In one embodiment, the GUI comprises four main areas: At the top are the drop down menus which allow the user to edit/view configuration information, toggle visualization overlays as well as run reports of different kinds including security analytics and anomaly detection reports. At the left of the GUI is the connection matrix summary representing the list of traffic flow "Connections" observed on the SCADA network. Although there are many different ways to define a connection in an IP network, in this example a connection is defined via a four-tuple (source IP address, destination IP address, protocol, server port number). At the right of the GUI is the network topology map for the SCADA network representing the connectivity of routers, switches, PLCs, RTUs and other discovered devices. The situational awareness overlay capability allows the user to choose to view either the full network map or highlighted portions of the map. For example, the user could choose to view only those devices which are running the Modbus protocol—thus reflecting the PLCs and HMIs, allowing the user to visually identify illegitimate sources of Modbus traffic, possibly representing a security threat. Finally, at the bottom is the Security Incident Alarm window which presents the list of security incidents detected and raised by the anomaly detection module. FIG. 12 presents an example of the above illustrated view for the CSAT-SCADA GUI 94 (the Security Incident Alarm Window has been minimized and is not shown in the illustration).

Figure 13:
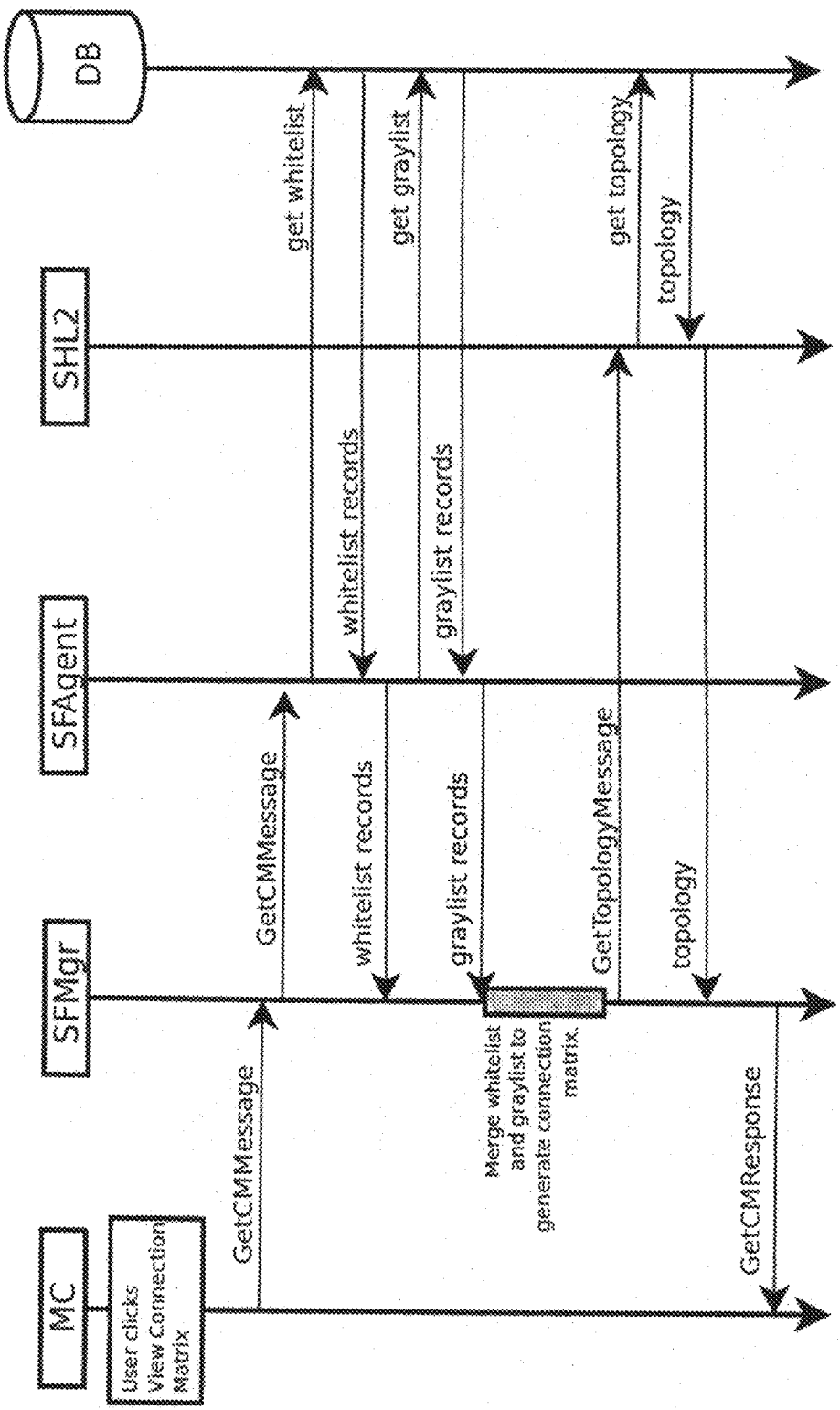
FIG. 13 illustrates an exemplary component interactions and messaging involved to build Situational Awareness for a CSAT-SCADA GUI.

FIG. 13 depicts the communications involved in building the situational awareness view for the CSAT-GUI 94 (referred to as MC in the FIG. 13), in accordance with one exemplary embodiment. In this example, the user clicks on the connection matrix to view information related to a particular SCADA protocol. A message is sent to the Flow Manager module (SFMgr) on the CSAT-backend 90 triggering a series of messages to retrieve both topology information, and connection information to be used by the GUI in building the situational awareness overlay in the CSAT-GUI 94. The CSAT-Backend in this rendition is composed of four components: a flow manager (SFMgr) which communicates with one or more network traffic analysis engines (the SFAgent) or network topology analysis modules (SHL2). The backend will also include a database (DB) component for data persistence.

Referring back to FIG. 10, in accordance with one embodiment, design elements for the SCADA Situational Awareness Analyzer 260 is presented. The SCADA-CSAT tool displays security incident information on a dynamically discovered network map. It includes VCR-like network traffic replay capabilities, allowing replay of incident events and network topologies, allowing the operator to view the changing topology and mapped SCADA security incidents over time. The mapped security incidents include detected anomalous network traffic behavior on the SCADA network. SCADA communication patterns are classified according to whitelisted, black-listed and grey-listed and the communication patterns illustrated on the network map. SCADA protocol communications are illustrated over the network map, depicting the path taken through the network. Device security vulnerability information is obtained and integrated with the situational awareness map to indicate which devices on the SCADA network may have vulnerabilities. Risk metric analytics are utilized to identify those devices on the SCADA network which are the most vulnerable to cyber attacks—either by virtue of the number and severity of vulnerabilities but also by virtue of their location in the network. Device vulnerabilities can be obtained passively by interrogating a device for a list of software and their versions and then correlating the list against well known vulnerability databases such as NVD. Alternatively, the output of active vulnerability scanners such as OpenVAS can be utilized to obtain the list of vulnerabilities. For SCADA networks it is preferable to utilize the passive approach as the active vulnerability scanners can cause undesired and harmful effects on the PLCs which control physical processes.

The output of security analytics processors 250 are integrated with the network map to provide additional situational awareness capabilities. The security analytics processors 250 analyze network traffic flow information to detect other security threats or interesting behavior not detected by signature based or anomaly-detection based algorithms. By visualizing the analytics with the network map, decisions can be made for further investigation and drill down.

In one example, the security analytics report include Long-lived flows, where the network traffic flow information is analyzed to compute the duration of a particular SCADA network connection. A histogram report is then produced with frequency of flow lifetimes or durations. Most traffic flows will have a short lifetime of between one to five seconds. Flows that are long-lived and last longer than 30 seconds are depicted using a single histogram bucket. These long-lived flows can represent legitimate connections but can also represent command and control channels for Botnets on the SCADA network. The user can click on the histogram bucket for the flows with 30+ second lifetimes to obtain further drilldown information in the context of the network map.

In another example, the security analytics report include Flow-size, where the network traffic flow information is analyzed to compute the number of bytes exchanged by this traffic flow. A histogram report is then produced with frequency of flow sizes (in bytes). Flows with large byte sizes which do not match well known applications (such as video) are further examined as candidates which warrant closer scrutiny.

In another example, the security analytics report include Incomplete TCP connections, where the network traffic flow information is analyzed to obtain the set of incomplete TCP flows. Incomplete TCP flows are flows where the Netflow information shows the SYN flag in TCP having being present but not the FIN flag. In other cases, a FIN flag may be present without a SYN flag. The volume of incomplete TCP connections is then counted and plotted over time—the duration of time is selected by the user. In general, when looking at this graph, it is expected that the volume stays reasonably steady for a given network. However, sudden spikes and large changes in the number of incomplete TCP sessions warrants the security operator to further interrogate the time period in question to determine if there are any patterns associated with the TCP sessions for that time period, e.g. if they all originate from a particular IP address.

In yet another example, the security analytics report include DNS traffic, where the network traffic flow information is analyzed to obtain the volume of DNS traffic. The volume and percentage (%) of DNS traffic as a % of the total network traffic is plotted over time. In general DNS (Domain Name Server) queries on a network should be reasonably steady when plotted over time. Large changes in the volume of DNS traffic warrant closer examination as this could be associated with security incidents.

Figure 14:
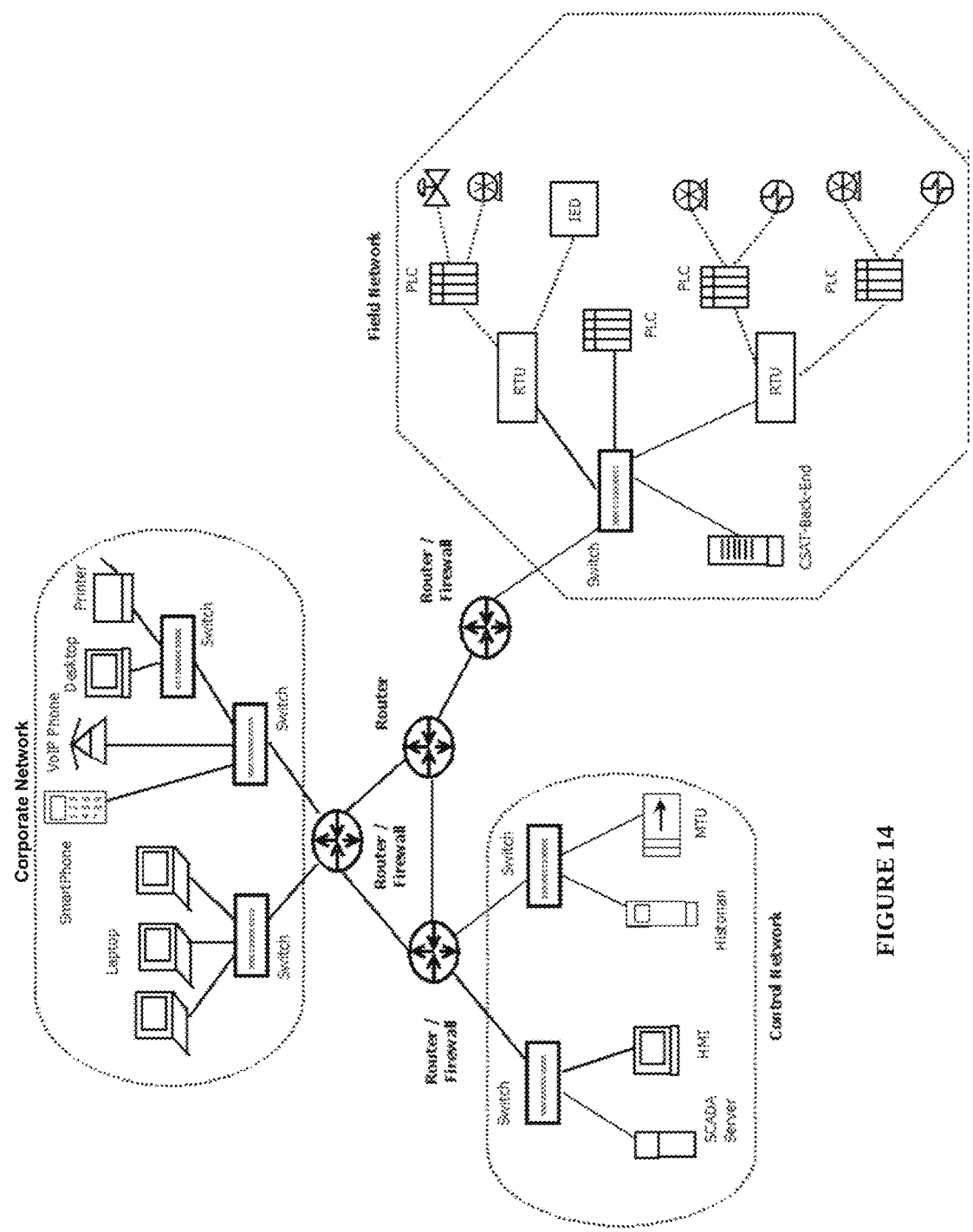
FIG. 14 illustrates an exemplary SCADA network having a single CSAT Back-End.
Figure 15:
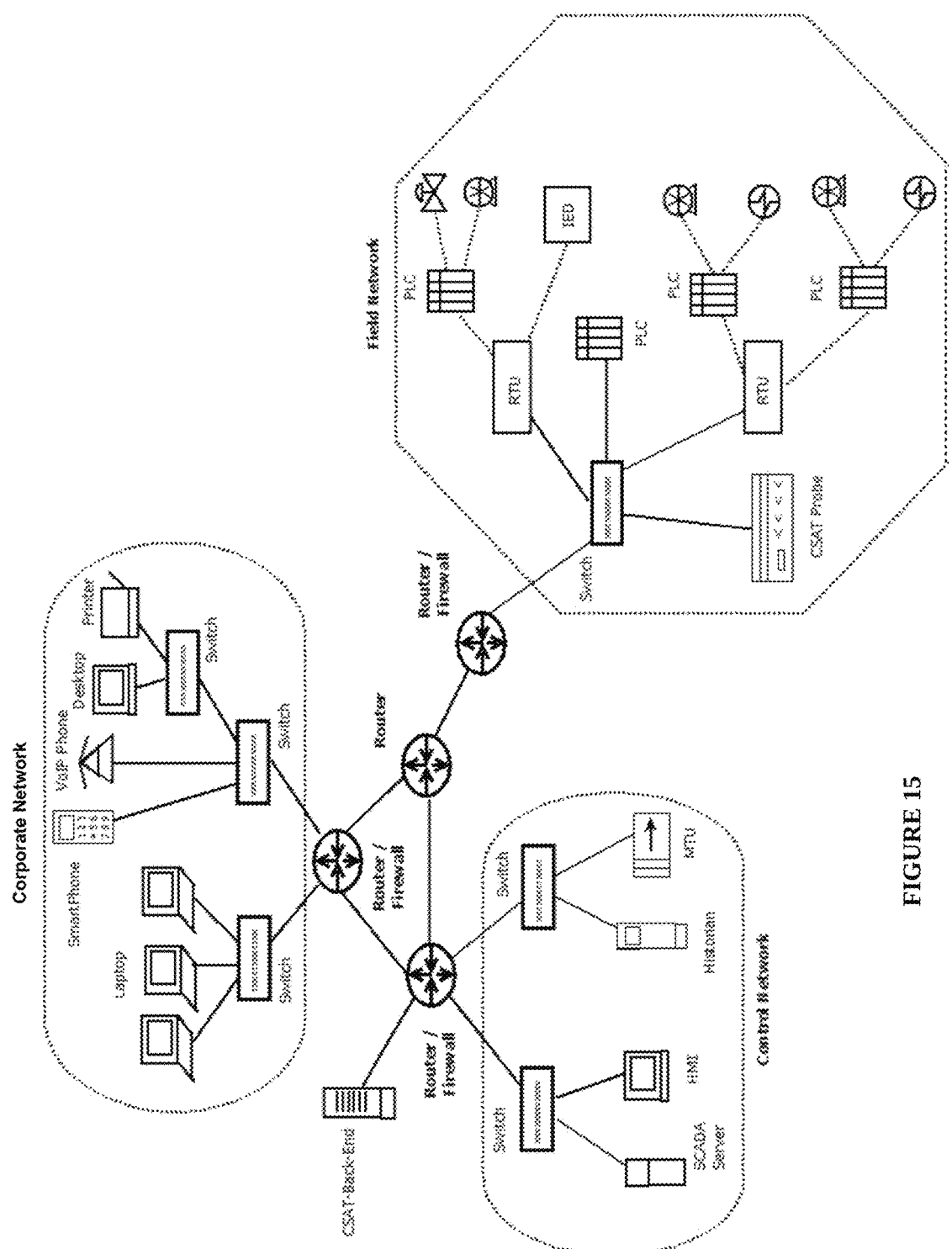
FIG. 15 illustrates an exemplary SCADA network having a CSAT Back-End with CSAT Probe.

FIG. 14 depicts an exemplary SCADA network. The network diagram includes a segmented network (corporate, control and field) with a diversity of devices including PLCs (Programmable Logic Controllers), RTUs (Remote Terminal Unit), and IEDs (Intelligent Electronic Device). FIG. 14 also depicts deployment of the CSAT back-end on the mirror port of the main switch which has visibility of all traffic to and from the RTU and PLCs in the field network. It also receives the SNMP and routing protocol information required for it to discover the SCADA network topology. In one embodiment, the CSAT-backend 90 architecture depicted in FIG. 10 further enables the possibility of dividing the functionality into multiple devices. For example, as illustrated in FIG. 15, the main CSAT backend is deployed on a server connected to one of the corporate routers. However, the CSAT probe is deployed off a mirror port on a switch in the field network. In this scenario, the CSAT probe, acting as an agent monitors the flow traffic and maintains certain intelligence. The CSAT backend carries out the topology discovery and situational awareness.

It should be noted that methods and systems of the embodiments of the invention and data sets described above are not, in any sense, abstract or intangible. Instead, the data is necessarily presented in a digital form and stored in a physical data-storage computer-readable medium, such as an electronic memory, mass-storage device, or other physical, tangible, data-storage device and medium. It should also be noted that the currently described data-processing and data-storage methods cannot be carried out manually by a human analyst, because of the complexity and vast numbers of intermediate results generated for processing and analysis of even quite modest amounts of data. Instead, the methods described herein are necessarily carried out by electronic computing systems having processors on electronically or magnetically stored data, with the results of the data processing and data analysis digitally stored in one or more tangible, physical, data-storage devices and media.

Methods and systems of the present invention have tangible and practical advantages, providing more expedient and more reliable identification of network topology, and classification and identification of devices in networks.

Systems and apparatus of the embodiments of the invention may be implemented as any of a variety of suitable circuitry, such as one or more microprocessors, digital signal processors (DSPs), application-specific integrated circuits (ASICs), field programmable gate arrays (FPGAs), discrete logic, software, hardware, firmware or any combinations thereof. When modules of the systems of the embodiments of the invention are implemented partially or entirely in software, the modules contain a memory device for storing software instructions in a suitable, non-transitory computer-readable storage medium, and software instructions are executed in hardware using one or more processors to perform the techniques of this disclosure.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto.

The invention claimed is:

1. A method for discovering topology of a network comprising a Layer 3 and a Layer 2, the method comprising:
   employing at least one hardware processor for:
      discovering a first Layer 3 network topology by examining routing protocols using route analytics method;
      discovering a second Layer 3 network topology using information from at least one of Simple Network Management Protocol (SNMP) and Source Shell/Command Line Interface/Telnet login to a router; and
      merging and deduplicating the first discovered Layer 3 network topology and the second discovered Layer 3 network topology to obtain a resultant Layer 3 network topology that includes a plurality of routers and associated links between the routers.

2. The method of claim 1, further comprising using the resultant Layer 3 network topology to identify a plurality of subnets in Layer 2 corresponding to each of the plurality of routers by:
   retrieving a list of active interfaces for each discovered router; and
   discovering routable subnets on each active interface using a combination of information from the SNMP and the routing protocols.

3. The method of claim 2, further comprising detecting a plurality of active devices and a plurality of silent devices in each of the plurality of identified subnets in Layer 2 to discover topology of the Layer 2 of the network.

4. The method of claim 3, further comprising merging and deduplicating the discovered topology of the Layer 2 with the resultant topology of the Layer 3 to discover a full Layer 2/3 topology.

5. The method of claim 3, wherein the detecting of silent devices comprises monitoring and analyzing network traffic flow information and examining data obtained from the plurality of routers and a plurality of switches in the Layer 2.

6. The method of claim 5, wherein the analyzing traffic flow information further comprises determining IP addresses of devices that are sending and/or receiving traffic-flow, and ensuring the traffic-flow is bi-directional.

7. The method of claim 5, wherein the examining data comprises using at least one of SNMP and Command Line Interface (CLI) to examine Address Resolution Protocol (ARP) tables and Address Forwarding Tables (AFT) of the plurality of switches.

8. The method of claim 3, further comprising classifying the detected plurality of active and silent devices, comprising:
   fusing data from at least two classification methods;
   obtaining a certainty level for device classification by combining certainty levels for type of device outputted from the at least two classification methods; and
   using the certainty level to identify device type and class.

9. The method of claim 8, wherein the at least two classification methods include any two of the SNMP analysis, Media Access Control (MAC) analysis and network traffic-flow analysis.

10. The method of claim 1, wherein the merging and deduplicating of the first discovered Layer 3 network topology and the second discovered Layer 3 network topology further comprises:
   distilling the first and second discovered network topologies into a plurality of nodes and links;
   searching the plurality of nodes in the first and the second discovered Layer 3 network topology;
   identifying a plurality of candidate nodes in the second discovered topology that are not present in the first discovered topology, and add the candidate nodes to the first discovered topology;
   searching the plurality of links in the first and the second discovered Layer 3 network topology;
   discarding links found in the second discovered topology that also exists in the first discovered topology;
   identifying a plurality of candidate links in the second discovered topology that are not present in the first discovered topology; and
   using information from the SNMP and the routing protocols to validate a set of links from the plurality of candidate links and add the validated set of links to the first discovered topology.

11. The method of claim 1, comprising discovering the topology of a Supervisory Control and Data Acquisition (SCADA) network.

12. A system for discovering topology of a network comprising a Layer 3 and a Layer 2, the system comprising:
   at least one hardware processor, and computer readable storage medium having computer readable instructions stored thereon for execution by the processor, causing the processor to:
      discover a first Layer 3 network topology by examining routing protocols using route analytics method;
      discover a second Layer 3 network topology using information from at least one of Simple Network Management Protocol (SNMP) and Source Shell/Command Line Interface/Telnet login to a router; and merge and deduplicate the first discovered Layer 3 network topology and the second discovered Layer 3 network topology to obtain a resultant Layer 3 network topology that includes a plurality of routers and associated links between the routers.

13. The system of claim 12, wherein the computer readable instructions further cause the processor to use the resultant Layer 3 network topology to identify a plurality of subnets in Layer 2 corresponding to each of the plurality of routers by:

retrieving a list of active interfaces for each discovered router; and discovering routable subnets on each active interface using a combination of information from the SNMP and the routing protocols.

14. The system of claim 13, wherein the computer readable instructions further cause the processor to detect a plurality of active devices and a plurality of silent devices in each of the plurality of identified subnets in Layer 2 to discover topology of the Layer 2 of the network.

15. The system of claim 14, wherein the computer readable instructions further cause the processor to merge and deduplicate the discovered topology of the Layer 2 with the resultant topology of the Layer 3 to discover a full Layer 2/3 topology.

16. The system of claim 14, wherein the computer readable instructions further cause the processor to detect silent devices by monitoring and analyzing network traffic flow information and examining data obtained from the plurality of routers and a plurality of switches in the Layer 2.

17. The system of claim 16, wherein the computer readable instructions further cause the processor to determine IP addresses of devices that are sending and/or receiving traffic-flow, and ensuring the traffic-flow is bi-directional.

18. The system of claim 16, wherein the computer readable instructions further cause the processor to use at least one of SNMP and Command Line Interface (CLI) to examine Address Resolution Protocol (ARP) tables and Address Forwarding Tables (AFT) of the plurality of switches for the examining data.

19. The system of claim 14, wherein the computer readable instructions further cause the processor to classify the detected plurality of active and silent devices by:

fusing data from at least two classification methods;

obtaining a certainty level for device classification by combining certainty levels for type of device outputted from the at least two classification methods; and using the certainty level to identify device type and class.

20. The system of claim 19, wherein the computer readable instructions further cause the processor to classify according to any two classification methods, consisting of the SNMP analysis, Media Access Control (MAC) analysis and network traffic-flow analysis.

21. The system of claim 12, wherein the computer readable instructions further cause the processor to merge and deduplicate of the first discovered Layer 3 network topology and the second discovered Layer 3 network topology, comprising:

distilling the first and second discovered network topologies into a plurality of nodes and links;

searching the plurality of nodes in the first and the second discovered Layer 3 network topology;

identifying a plurality of candidate nodes in the second discovered topology that are not present in the first discovered topology, and add the candidate nodes to the first discovered topology;

searching the plurality of links in the first and the second discovered Layer 3 network topology;

discarding links found in the second discovered topology that also exists in the first discovered topology;

identifying a plurality of candidate links in the second discovered topology that are not present in the first discovered topology; and using information from the SNMP and the routing protocols to validate a set of links from the plurality of candidate links and add the validated set of links to the first discovered topology.

22. A network comprising a plurality of routers, comprising:

a system for discovering topology of a network comprising a Layer 3 and a Layer 2, the system comprising:

at least one hardware processor, and computer readable storage medium having computer readable instructions stored thereon for execution by the processor, causing the processor to:

discover a first Layer 3 network topology by examining routing protocols using route analytics method;

discover a second Layer 3 network topology using information from at least one of Simple Network Management Protocol (SNMP) and Source Shell/Command Line Interface/Telnet login to a router; and merge and deduplicate the first discovered Layer 3 network topology and the second discovered Layer 3 network topology to obtain a resultant Layer 3 network topology that includes a plurality of routers and associated links between the routers.

* * * * *